United States Patent
Matson et al.

(10) Patent No.: US 9,388,282 B2
(45) Date of Patent: Jul. 12, 2016

(54) METHOD OF THIOPHENOL REMOVAL FROM POLY(ARYLENE SULFIDE) POLYMER COMPOSITIONS

(71) Applicant: SOLVAY SA, Brussels (BE)

(72) Inventors: Michael S. Matson, Bartlesville, OK (US); David A. Soules, Bartlesville, OK (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 0 days.

(21) Appl. No.: 14/066,063

(22) Filed: Oct. 29, 2013

(65) Prior Publication Data

US 2015/0119550 A1  Apr. 30, 2015

(51) Int. Cl.
| | |
|---|---|
| C08G 75/14 | (2006.01) |
| C08G 79/04 | (2006.01) |
| C08L 81/00 | (2006.01) |
| C08L 81/02 | (2006.01) |

(52) U.S. Cl.
CPC ................ *C08G 75/14* (2013.01); *C08G 79/04* (2013.01); *C08L 81/00* (2013.01); *C08L 81/02* (2013.01)

(58) Field of Classification Search
CPC .. C08G 75/14; C08G 75/025; C08G 75/0259; C08G 75/0281; C08F 6/28
USPC ......................................................... 528/373
See application file for complete search history.

(56) References Cited

U.S. PATENT DOCUMENTS

| | | | |
|---|---|---|---|
| 3,354,129 A | 11/1967 | Edmonds, Jr. et al. | |
| 3,415,889 A | 12/1968 | Louthan | |
| 3,919,177 A | 11/1975 | Campbell | |
| 4,038,261 A | 7/1977 | Crouch et al. | |
| 4,038,262 A | 7/1977 | Edmonds, Jr. | |
| 4,038,263 A | 7/1977 | Edmonds, Jr. et al. | |
| 4,064,114 A | 12/1977 | Edmonds, Jr. | |
| 4,116,947 A | 9/1978 | Edmonds, Jr. et al. | |
| 4,282,347 A | 8/1981 | Tieszen et al. | |
| 4,350,810 A | 9/1982 | Tieszen et al. | |
| 4,808,694 A | 2/1989 | Edmonds, Jr. et al. | |
| 4,841,018 A | 6/1989 | Gaughan | |
| 4,895,959 A | 1/1990 | Kato et al. | |
| 5,023,315 A | 6/1991 | Ceurvorst et al. | |
| 5,245,000 A | 9/1993 | Bobsein et al. | |
| 5,296,579 A | 3/1994 | Geibel et al. | |
| 5,328,980 A | 7/1994 | Decker et al. | |
| 5,384,391 A | 1/1995 | Miyata et al. | |
| 5,438,115 A | 8/1995 | Fahey et al. | |
| 5,696,282 A * | 12/1997 | Shaw et al. | 560/152 |
| 5,929,203 A | 7/1999 | Ash et al. | |
| 6,051,720 A | 4/2000 | Geibel et al. | |

FOREIGN PATENT DOCUMENTS

| | | |
|---|---|---|
| JP | 11349566 A | 12/1999 |
| JP | 2010126621 A | 6/2010 |

OTHER PUBLICATIONS

Fahey, Darryl R., et al., "Poly(p-Phenylene Sulfide) (Syntehsis by p-Dichlorobenzene and Sodium Sulfide)," Polymeric Materials Encyclopedia, 1996, pp. 6506-6515, vol. 8, CRC Press, Inc.
"Group notation revised in periodic table," Feb. 4, 1985, C&EN, pp. 26-27.
Itoh, Takahiro, et al., "Practical Thiol Surrogates and Protective Groups for Arythiols for Suzuki—Miyaura Conditions." J. Org. Chem., 2006, pp. 2203-2206, vol. 71, No. 5, American Chemical Society.
McNaught, Alan D., et al., "Compendium of Chemical Terminology," International Union of Pure and Applied Chemistry, Second edition, 1997, Wiley-Blackwell.

* cited by examiner

*Primary Examiner* — Shane Fang
(74) *Attorney, Agent, or Firm* — Jarrod N. Raphael

(57) ABSTRACT

A process comprising contacting a reaction product composition comprising a poly(arylene sulfide) composition and a polar organic compound, wherein the polar organic compound comprises greater than or equal to about 1 wt. % thiophenol, with a $C_4$-$C_{30}$ α,β-unsaturated ketone, a $C_4$-$C_{30}$ α,β-unsaturated ester, a $C_4$-$C_{30}$ α,β-unsaturated amide, or any combination thereof, wherein after the contacting, the polar organic compound comprises less than about 1 wt. % thiophenol. A process comprising contacting a composition comprising a polar organic compound and greater than or equal to about 1 wt. % thiophenol with a $C_4$-$C_{30}$ α,β-unsaturated ketone, a $C_4$-$C_{30}$ α,β-unsaturated ester, a $C_4$-$C_{30}$ α,β-unsaturated amide, or any combination thereof, to form a composition comprising the polar organic compound and less than about 1 wt. % thiophenol.

15 Claims, No Drawings

METHOD OF THIOPHENOL REMOVAL FROM POLY(ARYLENE SULFIDE) POLYMER COMPOSITIONS

TECHNICAL FIELD

The present disclosure relates to a method of removing thiophenol from poly(arylene sulfide) polymer compositions. More specifically, the present disclosure relates to a method of using thiophenol removing agents (e.g., $\alpha,\beta$-unsaturated compounds) for removing thiophenol from poly(arylene sulfide) polymer compositions.

BACKGROUND

Polymers, such as poly(phenylene sulfide) and its derivatives, are used for the production of a wide variety of articles. The use of a particular polymer in a particular application will depend on the type of physical and/or mechanical properties displayed by the polymer, and such properties are generally a result of the method used for producing a particular polymer, e.g., the reaction conditions under which the polymer is produced. Thus, there is an ongoing need to develop and improve methods for producing these polymers.

BRIEF SUMMARY

Disclosed herein is a process comprising contacting a reaction product composition comprising a poly(arylene sulfide) composition and a polar organic compound, wherein the polar organic compound comprises greater than or equal to about 1 wt. % thiophenol, with a $C_4$-$C_{30}$ $\alpha,\beta$-unsaturated ketone, a $C_4$-$C_{30}$ $\alpha,\beta$-unsaturated ester, a $C_4$-$C_{30}$ $\alpha,\beta$-unsaturated amide, or any combination thereof, wherein after the contacting, the polar organic compound comprises less than about 1 wt. % thiophenol.

Also disclosed herein is a process comprising contacting a composition comprising a polar organic compound and greater than or equal to about 1 wt. % thiophenol with a $C_4$-$C_{30}$ $\alpha,\beta$-unsaturated ketone, a $C_4$-$C_{30}$ $\alpha,\beta$-unsaturated ester, a $C_4$-$C_{30}$ $\alpha,\beta$-unsaturated amide, or any combination thereof, to form a composition comprising the polar organic compound and less than about 1 wt. % thiophenol.

DETAILED DESCRIPTION

Disclosed herein are methods of treating a composition comprising thiophenol to reduce the amount of thiophenol therein. In an embodiment, the composition comprising thiophenol comprises a polymer, one or more components or reactants of a polymerization reaction, and/or a polymerization reaction product (e.g., effluent). In an embodiment, the composition comprising thiophenol comprises a poly(arylene sulfide) polymer. In an embodiment, the composition comprising thiophenol is a poly(arylene sulfide) polymerization reaction product, for example an effluent stream from a poly(arylene sulfide) polymerization reactor. In an embodiment, the poly(arylene sulfide) polymerization reaction product comprises a poly(arylene sulfide) polymer, a polar organic compound, and thiophenol. In an embodiment, the poly(arylene sulfide) polymerization reaction product may undergo one or more separation steps prior to, concurrent with, and/or subsequent to treatment to reduce the amount of thiophenol therein. For example, a poly(arylene sulfide) polymerization reaction product may undergo a separation step to separate a poly(arylene sulfide) polymer and/or a polar organic compound, wherein thiophenol may be present in a separated poly(arylene sulfide) polymer, a separated polar organic compound, or both prior to treatment. For purposes of the disclosure herein, treating a composition comprising thiophenol will be understood to include, but is not limited to, treating a poly(arylene sulfide) polymerization reaction product and/or a component thereof (e.g., separated poly(arylene sulfide) polymer and/or a polar organic compound) and is collectively referred to herein as treating a poly(arylene sulfide) composition.

In an embodiment, a method of the present disclosure comprises treating a poly(arylene sulfide) composition with a thiophenol removing agent (e.g., an $\alpha,\beta$-unsaturated compound) to reduce the concentration of thiophenol therein. While the present disclosure will be discussed in detail in the context of treating a poly(arylene sulfide) composition with a thiophenol removing agent (e.g., an $\alpha,\beta$-unsaturated compound) to reduce the concentration of thiophenol therein, it should be understood that other compositions comprising thiophenol may be treated with a thiophenol removing agent (e.g., an $\alpha,\beta$-unsaturated compound) to reduce the concentration of thiophenol therein. In an embodiment, such methods may result in polymers (e.g., poly(phenylene sulfide)) with desirable properties (e.g., molecular weight).

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in *Chemical and Engineering News*, 63(5), 27, 1985. In some instances a group of elements may be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogens atoms, as necessary for the situation, removed from the alkane. Throughout, the disclosure that a substituent, ligand, or other chemical moiety may constitute a particular "group" implies that the well-known rules of chemical structure and bonding are followed when that group is employed as described. When describing a group as being "derived by,"

"derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups may also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence or absence of a branched underlying structure or backbone.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be reference using comprising or some other alternative language. For example, a reference to a phenyl group comprising a substituent at the 4 position refers to a group having a non-hydrogen atom at the 4 position and hydrogen or any non-hydrogen group at the 2, 3, 5, and 6 positions.

The term "organyl group" is used herein in accordance with the definition specified by IUPAC: an organic substituent group, regardless of functional type, having one free valence at a carbon atom. Similarly, an "organylene group" refers to an organic group, regardless of functional type, derived by removing two hydrogen atoms from an organic compound, either two hydrogen atoms from one carbon atom or one hydrogen atom from each of two different carbon atoms. An "organic group" refers to a generalized group formed by removing one or more hydrogen atoms from carbon atoms of an organic compound. Thus, an "organyl group," an "organylene group," and an "organic group" can contain organic functional group(s) and/or atom(s) other than carbon and hydrogen, that is, an organic group that can comprise functional groups and/or atoms in addition to carbon and hydrogen. For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, and phosphines, and so forth. In one aspect, the hydrogen atom(s) removed to form the "organyl group," "organylene group," or "organic group" can be attached to a carbon atom belonging to a functional group, for example, an acyl group (—C(O)R), a formyl group (—C(O)H), a carboxy group (—C(O)OH), a hydrocarboxycarbonyl group (—C(O)OR), a cyano group (—C≡N), a carbamoyl group (—C(O)NH$_2$), a N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the "organyl group," "organylene group," or "organic group" can be attached to a carbon atom not belonging to, and remote from, a functional group, for example, —CH$_2$C(O)CH$_3$, —CH$_2$NR$_2$. An "organyl group," "organylene group," or "organic group" can be aliphatic, inclusive of being cyclic or acyclic, or can be aromatic. "Organyl groups," "organylene groups," and "organic groups" also encompass heteroatom-containing rings, heteroatom-containing ring systems, heteroaromatic rings, and heteroaromatic ring systems. "Organyl groups," "organylene groups," and "organic groups" can be linear or branched unless otherwise specified. Finally, it is noted that the "organyl group," "organylene group," or "organic group" definitions include "hydrocarbyl group," "hydrocarbylene group," "hydrocarbon group," respectively, and "alkyl group," "alkylene group," and "alkane group," respectively, as members.

The term "hydrocarbon" whenever used in this specification and claims refers to a compound containing only carbon and hydrogen. Other identifiers can be utilized to indicate the presence of particular groups in the hydrocarbon (e.g. halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

The term "alkane" whenever used in this specification and claims refers to a saturated hydrocarbon compound. Other identifiers can be utilized to indicate the presence of particular groups in the alkane (e.g. halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or can be linear or branched unless otherwise specified.

A "cycloalkane" is a saturated cyclic hydrocarbon, with or without side chains, for example, cyclobutane. Other identifiers can be utilized to indicate the presence of particular groups in the cycloalkane (e.g. halogenated cycloalkane indicates the presence of one or more halogen atoms replacing an equivalent number of hydrogen atoms in the cycloalkane). Unsaturated cyclic hydrocarbons having one or more endocyclic double or triple bonds are called cycloalkenes and cycloalkynes, respectively. Cycloalkenes and cycloalkynes having only one, only two, and only three endocyclic double or triple bonds, respectively, can be identified by use of the term "mono," "di," and "tri within the name of the cycloalkene or cycloalkyne. Cycloalkenes and cycloalkynes can further identify the position of the endocyclic double or triple bonds. Other identifiers can be utilized to indicate the presence of particular groups in the cycloalkane (e.g. halogenated cycloalkane indicates that the presence of one or more halogen atoms replacing an equivalent number of hydrogen atoms in the cycloalkane).

A "cycloalkyl group" is a univalent group derived by removing a hydrogen atom from a ring carbon atom from a cycloalkane. For example, a 1-methylcyclopropyl group and a 2-methylcyclopropyl group are illustrated as follows.

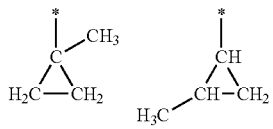

Similarly, a "cycloalkylene group" refers to a group derived by removing two hydrogen atoms from a cycloalkane, at least one of which is a ring carbon. Thus, a "cycloalkylene group" includes both a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane. It should be noted that according to the definitions provided herein, general cycloalkane groups (including cycloalkyl groups and cycloalkylene groups) include those having zero, one, or more than one hydrocarbyl substituent groups attached to a cycloalkane ring carbon atom (e.g. a methylcyclopropyl group) and is member of the group of hydrocarbon groups. However, when referring to a cycloalkane group having a specified number of cycloalkane ring carbon atoms (e.g. cyclopentane group or cyclohexane group, among others), the base name of the cycloalkane group having a defined number of cycloalkane ring carbon atoms refers to the unsubstituted cycloalkane group. Consequently, a substituted cycloalkane group having a specified number of ring carbon atoms (e.g. substituted cyclopentane or substituted cyclohexane, among others) refers to the respective group having one or more substituent groups (including halogens, hydrocarbyl groups, or hydrocarboxy groups, among other substituent groups) attached to a cycloalkane group ring carbon atom. When the substituted cycloalkane group having a defined number of cycloalkane ring carbon atoms is a member of the group of hydrocarbon groups (or a member of the general group of cycloalkane groups), each substituent of the substituted cycloalkane group having a defined number of cycloalkane ring carbon atoms is limited to hydrocarbyl substituent group. One can readily discern and select general groups, specific groups, and/or individual substituted cycloalkane group(s) having a specific number of ring carbons atoms which can be utilized as member of the hydrocarbon group (or a member of the general group of cycloalkane groups).

An aromatic compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2). While arene compounds and heteroarene compounds are mutually exclusive members of the group of aromatic compounds, a compound that has both an arene group and a heteroarene group are generally considered a heteroarene compound. Aromatic compounds, arenes, and heteroarenes can be monocyclic (e.g., benzene, toluene, furan, pyridine, methylpyridine) or polycyclic unless otherwise specified. Polycyclic aromatic compounds, arenes, and heteroarenes, include, unless otherwise specified, compounds wherein the aromatic rings can be fused (e.g., naphthalene, benzofuran, and indole), compounds where the aromatic groups can be separate and joined by a bond (e.g., biphenyl or 4-phenylpyridine), or compounds where the aromatic groups are joined by a group containing linking atoms (e.g., carbon—the methylene group in diphenylmethane; oxygen—diphenyl ether; nitrogen—triphenyl amine; among others linking groups). As disclosed herein, the term "substituted" can be used to describe an aromatic group, arene, or heteroarene wherein a non-hydrogen moiety formally replaces a hydrogen in the compound, and is intended to be non-limiting.

An "aromatic group" refers to a generalized group formed by removing one or more hydrogen atoms (as necessary for the particular group and at least one of which is an aromatic ring carbon atom) from an aromatic compound. For a univalent "aromatic group," the removed hydrogen atom must be from an aromatic ring carbon. For an "aromatic group" formed by removing more than one hydrogen atom from an aromatic compound, at least one hydrogen atom must be from an aromatic hydrocarbon ring carbon. Additionally, an "aromatic group" can have hydrogen atoms removed from the same ring of an aromatic ring or ring system (e.g., phen-1,4-ylene, pyridin-2,3-ylene, naphth-1,2-ylene, and benzofuran-2,3-ylene), hydrogen atoms removed from two different rings of a ring system (e.g., naphth-1,8-ylene and benzofuran-2,7-ylene), or hydrogen atoms removed from two isolated aromatic rings or ring systems (e.g., bis(phen-4-ylene)methane).

An arene is aromatic hydrocarbon, with or without side chains (e.g. benzene, toluene, or xylene, among others). An "aryl group" is a group derived by the formal removal of a hydrogen atom from an aromatic ring carbon of an arene. It should be noted that the arene can contain a single aromatic hydrocarbon ring (e.g., benzene, or toluene), contain fused aromatic rings (e.g., naphthalene or anthracene), and/or contain one or more isolated aromatic rings covalently linked via a bond (e.g., biphenyl) or non-aromatic hydrocarbon group(s) (e.g., diphenylmethane). One example of an "aryl group" is ortho-tolyl (o-tolyl), the structure of which is shown here.

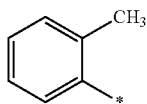

Similarly, an "arylene group" refers to a group formed by removing two hydrogen atoms (at least one of which is from an aromatic ring carbon) from an arene. An "arene group" refers to a generalized group formed by removing one or more hydrogen atoms (as necessary for the particular group and at least one of which is an aromatic ring carbon) from an arene. However, if a group contains separate and distinct arene and heteroarene rings or ring systems (e.g., the phenyl and benzofuran moieties in 7-phenylbenzofuran) its classification depends upon the particular ring or ring system from which the hydrogen atom was removed, that is, a substituted arene group if the removed hydrogen came from the aromatic hydrocarbon ring or ring system carbon atom (e.g., the 2 carbon atom in the phenyl group of 6-phenylbenzofuran) and a heteroarene group if the removed hydrogen carbon came from a heteroaromatic ring or ring system carbon atom (e.g., the 2 or 7 carbon atom of the benzofuran group of 6-phenylbenzofuran). It should be noted that according the definitions provided herein, general arene groups (including an aryl group and an arylene group) include those having zero, one, or more than one hydrocarbyl substituent groups located on an aromatic hydrocarbon ring or ring system carbon atom (e.g., a toluene group or a xylene group, among others) and is a member of the group of hydrocarbon groups. However, a phenyl group (or phenylene group) and/or a naphthyl group (or naphthylene group) refer to the specific unsubstituted arene groups. Consequently, a substituted phenyl group or substituted naphthyl group refers to the respective arene group having one or more substituent groups (including halogens, hydrocarbyl groups, or hydrocarboxy groups, among others) located on an aromatic hydrocarbon ring or ring system carbon atom. When the substituted phenyl group and/or substituted naphthyl group is a member of the group of hydrocarbon groups (or a member of the general group of arene groups), each substituent is limited to a hydrocarbyl substituent group. One having ordinary skill in the art can readily discern and select general phenyl and/or naphthyl groups, specific phenyl and/or naphthyl groups, and/or individual substituted phenyl or substituted naphthyl groups which can be utilized as a member of the group of hydrocarbon groups (or a member of the general group of arene groups).

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. The term "consisting essentially of" occupies a middle ground between closed terms like "consisting of" and fully open terms like "comprising." Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprise several recited steps (and other non-recited steps) but utilize a catalyst system preparation consisting of specific or alternatively consisting essentially of specific steps but utilize a catalyst system comprising recited components and other non-recited components.

While compositions and methods are described in terms of "comprising" (or other broad term) various components and/or steps, the compositions and methods can also described using narrower terms such as "consist essentially of" or "consist of" the various components and/or steps.

Use of the term "optionally" with respect to any element of a claim is intended to mean that the subject element is required, or alternatively, is not required. Both alternatives are intended to be within the scope of the claim.

The terms "a," "an," and "the" are intended, unless specifically indicated otherwise, to include plural alternatives, e.g., at least one. For any particular compound or group disclosed herein, any name or structure presented is intended to encompass all conformational isomers, regioisomers, and stereoisomers that can arise from a particular set of substituents, unless otherwise specified. For example, a general reference to pentane includes n-pentane, 2-methyl-butane, and 2,2-dimethylpropane and a general reference to a butyl group includes an n-butyl group, a sec-butyl group, an iso-butyl group, and t-butyl group. The name or structure also encompasses all enantiomers, diastereomers, and other optical isomers whether in enantiomeric or racemic forms, as well as mixtures of stereoisomers, as would be recognized by a skilled artisan, unless otherwise specified.

The terms "room temperature" or "ambient temperature" are used herein to describe any temperature from 15° C. to 35° C. wherein no external heat or cooling source is directly applied to the reaction vessel. Accordingly, the terms "room temperature" and "ambient temperature" encompass the individual temperatures and any and all ranges, subranges, and combinations of subranges of temperatures from 15° C. to 35° C. wherein no external heating or cooling source is directly applied to the reaction vessel. The term "atmospheric pressure" is used herein to describe an earth air pressure wherein no external pressure modifying means is utilized. Generally, unless practiced at extreme earth altitudes, "atmospheric pressure" is about 1 atmosphere (alternatively, about 14.7 psi or about 101 kPa).

Features within this disclosure that are provided as a minimum values can be alternatively stated as "at least" or "greater than or equal to" any recited minimum value for the feature disclosed herein. Features within this disclosure that are provided as a maximum values can be alternatively stated as "less than or equal to" any recited maximum value for the feature disclosed herein.

Embodiments disclosed herein may provide the materials listed as suitable for satisfying a particular feature of the embodiment delimited by the term "or." For example, a particular feature of the disclosed subject matter may be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

In an embodiment, the polymers disclosed herein are poly (arylene sulfide) (PAS) polymers. In an embodiment, the polymer can comprise a poly(arylene sulfide). In other embodiments, the polymer can comprise a poly(phenylene sulfide) (PPS). As used herein, use of "poly(arylene sulfide)" or "PAS" includes the terms "poly(phenylene sulfide)" and "PPS." Herein, the polymer refers both to a material collected as the product of a polymerization reaction and a polymeric composition comprising a polymer and one or more additives. In an embodiment, a monomer (e.g., p-dichlorobenzene) may be polymerized using the methodologies disclosed herein to produce a polymer of the type disclosed herein. In an embodiment, the polymer may comprise a homopolymer or a copolymer. It is to be understood that an inconsequential amount of comonomer may be present in the polymers disclosed herein and the polymer still be considered a homopolymer. Herein an inconsequential amount of a comonomer refers to an amount that does not substantively affect the properties of the polymer disclosed herein. For example a comonomer can be present in an amount of less than about 1.0 wt. %, 0.5 wt. %, 0.1 wt. %, or 0.01 wt. %, based on the total weight of polymer.

Generally, poly(arylene sulfide) is a polymer comprising a —(Ar—S)— repeating unit, wherein Ar is an arylene group. Unless otherwise specified the arylene groups of the poly (arylene sulfide) can be substituted or unsubstituted; alternatively, substituted; or alternatively, unsubstituted. Additionally, unless otherwise specified, the poly(arylene sulfide) can include any isomeric relationship of the sulfide linkages in polymer; e.g., when the arylene group is a phenylene group the sulfide linkages can be ortho, meta, para, or combinations thereof.

In an aspect, poly(arylene sulfide) can contain at least 5, 10, 20, 30, 40, 50, 60, 70 mole percent of the —(Ar—S)— unit. In an embodiment, the poly(arylene sulfide) can contain up to 50, 70, 80, 90, 95, 99, or 100 mole percent of the —(Ar—S)— unit. In some embodiments, poly(arylene sulfide) can contain from any minimum mole percent of the —(Ar—S)— unit disclosed herein to any maximum mole percent of the —(Ar—S)— unit disclosed herein; for example, from 5 to 99 mole percent, 30 to 70 mole percent, or 70 to 95 mole percent of the —(Ar—S)— unit. Other ranges for the poly(arylene sulfide) units are readily apparent from the present disclosure. Poly(arylene sulfide) containing less than 100 percent —(Ar—S)— can further comprise units having one or more of the following structures, wherein (*) as used throughout the disclosure represents a continuing portion of a polymer chain or terminal group:

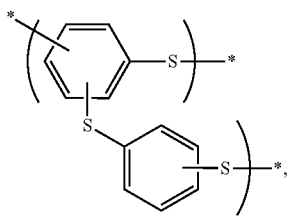

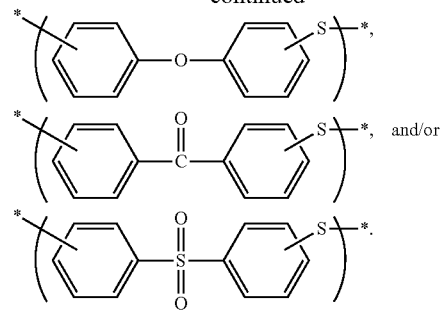

In an embodiment, the arylene sulfide unit can be represented by Formula I.

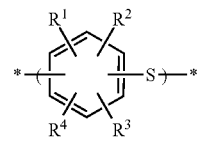

Formula I

It should be understood, that within the arylene sulfide unit having Formula I, the relationship between the position of the sulfur atom of the arylene sulfide unit and the position where the next arylene sulfide unit can be ortho, meta, para, or any combination thereof. Generally, the identity of $R^1$, $R^2$, $R^3$, and $R^4$ are independent of each other and can be any group described herein.

In an embodiment, $R^1$, $R^2$, $R^3$, and $R^4$ independently can be hydrogen or a substituent. In some embodiments, each substituent independently can be an organyl group, an organocarboxy group, or an organothio group; alternatively, an organyl group or an organocarboxy group; alternatively, an organyl group or an organothio group; alternatively, an organyl group; alternatively, an organocarboxy group; or alternatively, or an organothio group. In other embodiments, each substituent independently can be a hydrocarbyl group, a hydrocarboxy group, or a hydrocarbylthio group; alternatively, a hydrocarbyl group or a hydrocarboxy group; alternatively, a hydrocarbyl group or a hydrocarbylthio group; alternatively, a hydrocarbyl group; alternatively, a hydrocarboxy group; or alternatively, or a hydrocarbylthio group. In yet other embodiments, each substituent independently can be an alkyl group, an alkoxy group, or an alkylthio group; alternatively, an alkyl group or an alkoxy group; alternatively, an alkyl group or an alkylthio group; alternatively, an alkyl group; alternatively, an alkoxy group; or alternatively, or an alkylthio group.

In an embodiment, each organyl group which can be utilized as $R^1$, $R^2$, $R^3$, and/or $R^4$ independently can be a $C_1$ to $C_{20}$ organyl group; alternatively, a $C_1$ to $C_{10}$ organyl group; or alternatively, a $C_1$ to $C_5$ organyl group. In an embodiment, each organocarboxy group which can be utilized as $R^1$, $R^2$, $R^3$, and/or $R^4$ independently can be a $C_1$ to $C_{20}$ organocarboxy group; alternatively, a $C_1$ to $C_{10}$ organocarboxy group; or alternatively, a $C_1$ to $C_5$ organocarboxy group. In an embodiment, each organothio group which can be utilized as $R^1$, $R^2$, $R^3$, and/or $R^4$ independently can be a $C_1$ to $C_{20}$ organothio group; alternatively, a $C_1$ to $C_{10}$ organothio group; or alternatively, a $C_1$ to $C_5$ organothio group. In an embodiment, each hydrocarbyl group which can be utilized as $R^1$, $R^2$, $R^3$, and/or $R^4$ independently can be a $C_1$ to $C_{20}$ hydrocarbyl group; alternatively, a $C_1$ to $C_{10}$ hydrocarbyl group; or alternatively, a $C_1$ to $C_5$ hydrocarbyl group. In an embodiment, each hydrocarboxy group which can be utilized as $R^1$, $R^2$, $R^3$, and/or $R^4$ independently can be a $C_1$ to $C_{20}$ hydrocarboxy group; alternatively, a $C_1$ to $C_{10}$ hydrocarboxy group; or alternatively, a $C_1$ to $C_5$ hydrocarboxy group. In an embodiment, each hydrocarbyl group which can be utilized as $R^1$, $R^2$, $R^3$, and/or $R^4$ independently can be a $C_1$ to $C_{20}$ hydrocarbylthio group; alternatively, a $C_1$ to $C_{10}$ hydrocarbylthio group; or alternatively, a $C_1$ to $C_5$ hydrocarbylthio group. In an embodiment, each alkyl group which can be utilized as $R^1$, $R^2$, $R^3$, and/or $R^4$ independently can be a $C_1$ to $C_{20}$ alkyl group; alternatively, a $C_1$ to $C_{10}$ alkyl group; or alternatively, a $C_1$ to $C_5$ alkyl group. In an embodiment, each alkoxy group which can be utilized as $R^1$, $R^2$, $R^3$, and/or $R^4$ independently can be a $C_1$ to $C_{20}$ alkoxy group; alternatively, a $C_1$ to $C_{10}$ alkoxy group; or alternatively, a $C_1$ to $C_5$ alkoxy group. In an embodiment, each alkoxy group which can be utilized as $R^1$, $R^2$, $R^3$, and/or $R^4$ independently can be a $C_1$ to $C_{20}$ alkylthio group; alternatively, a $C_1$ to $C_{10}$ alkylthio group; or alternatively, a $C_1$ to $C_5$ alkylthio group.

In some embodiments, each non-hydrogen $R^1$, $R^2$, $R^3$, and/or $R^4$ independently can be an alkyl group, a substituted alkyl group, a cycloalkyl group, a substituted cycloalkyl group, an aryl group, a substituted aryl group, an aralkyl group, or a substituted aralkyl group. In other embodiments, each non-hydrogen $R^1$, $R^2$, $R^3$, and/or $R^4$ independently can be an alkyl group or a substituted alkyl group; alternatively, a cycloalkyl group or a substituted cycloalkyl group; alternatively, an aryl group or a substituted aryl group; or alternatively, a aralkyl group or a substitute aralkyl group. In yet other embodiments, each non-hydrogen $R^1$, $R^2$, $R^3$, and/or $R^4$ independently can be an alkyl group; alternatively, a substituted alkyl group; alternatively, a cycloalkyl group; alternatively, a substituted cycloalkyl group; alternatively, an aryl group; alternatively, a substituted aryl group; alternatively, an aralkyl group; or alternatively, a substituted aralkyl group. Generally, the alkyl group, substituted alkyl group, cycloalkyl group, substituted cycloalkyl group, aryl group, substituted aryl group, aralkyl group, and substituted aralkyl group which can be utilized as R can have the same number of carbon atoms as any organyl group or hydrocarbyl group of which it is a member.

In an embodiment, each non-hydrogen $R^1$, $R^2$, $R^3$, and/or $R^4$ independently a methyl group, an ethyl group, a propyl group, a butyl group, a pentyl group, a hexyl group, a heptyl group, an octyl group, a nonyl group, or a decyl group. In some embodiments, each non-hydrogen $R^1$, $R^2$, $R^3$, and/or $R^4$ independently can be a methyl group, an ethyl group, a n-propyl group, an iso-propyl group, a n-butyl group, an iso-butyl group, a sec-butyl group, a tert-butyl group, an n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group. In some embodiments, any of the disclosed alkyl groups can be substituted. Substituents for the substituted alkyl group are independently disclosed herein and can be utilized without limitation to further describe the substituted alkyl group which can be utilized as a non-hydrogen $R^1$, $R^2$, $R^3$, and/or $R^4$.

In an aspect, each cycloalkyl group (substituted or unsubstituted) which can be utilized as a non-hydrogen $R^1$, $R^2$, $R^3$, and/or $R^4$ independently can be a $C_4$ to $C_{20}$ cycloalkyl group (substituted or unsubstituted); alternatively, a $C_5$ to $C_{15}$ cycloalkyl group (substituted or unsubstituted); or alternatively, a $C_5$ to $C_{10}$ cycloalkyl group (substituted or unsubstituted). In an embodiment, each non-hydrogen $R^1$, $R^2$, $R^3$, and/or $R^4$ independently can be a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. In other embodiments, each non-hydrogen $R^1$, $R^2$, $R^3$, and/or $R^4$ independently can be a cyclopentyl group, a substituted cyclopentyl group, a cyclohexyl group, or a substituted cyclohexyl group; alternatively, a cyclopentyl group or a substituted cyclopentyl group; or alternatively, a cyclohexyl group or a substituted cyclohexyl group. In further embodiments, each non-hydrogen $R^1$, $R^2$, $R^3$, and/or $R^4$ independently can be a cyclopentyl group; alternatively, a substituted cyclopentyl group; a cyclohexyl group; or alternatively, a substituted cyclohexyl group. Substituents for the substituted cycloalkyl group are independently disclosed herein and can be utilized without limitation to further describe the substituted cycloalkyl group which can be utilized as a non-hydrogen R group. Substituents for the substituted cycloalkyl groups (general or specific) are independently disclosed herein and can be utilized without limitation to further describe the substituted cycloalkyl groups which can be utilized as a non-hydrogen $R^1$, $R^2$, $R^3$, and/or $R^4$.

In an aspect, the aryl group (substituted or unsubstituted) which can be utilized as a non-hydrogen $R^1$, $R^2$, $R^3$, and/or $R^4$ independently can be a $C_6$-$C_{20}$ aryl group (substituted or unsubstituted); alternatively, a $C_6$-$C_{15}$ aryl group (substituted or unsubstituted); or alternatively, a $C_6$-$C_{10}$ aryl group (substituted or unsubstituted). In an embodiment, each $R^1$, $R^2$, $R^3$, and/or $R^4$ independently can be a phenyl group, a substituted phenyl group, a naphthyl group, or a substituted naphthyl group. In an embodiment, each $R^1$, $R^2$, $R^3$, and/or $R^4$ independently can be a phenyl group or a substituted phenyl group; alternatively, a naphthyl group or a substituted naphthyl group; alternatively, a phenyl group or a naphthyl group; or alternatively, a substituted phenyl group or a substituted naphthyl group.

In an embodiment, each substituted phenyl group which can be utilized as a non-hydrogen $R^1$, $R^2$, $R^3$, and/or $R^4$ independently can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other embodiments, each substituted phenyl group which can be utilized as a non-hydrogen $R^1$, $R^2$, $R^3$, and/or $R^4$ independently can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents for the substituted phenyl groups (general or specific) are independently disclosed herein and can be utilized without limitation to further describe the substituted phenyl groups which can be utilized as a non-hydrogen $R^1$, $R^2$, $R^3$, and/or $R^4$.

Nonlimiting examples of suitable poly(arylene sulfide) polymers suitable for use in this disclosure include poly(2,4- toluene sulfide), poly(4,4'-biphenylene sulfide), poly(para-phenylene sulfide), poly(ortho-phenylene sulfide), poly(meta-phenylene sulfide), poly(xylene sulfide), poly(ethylisopropylphenylene sulfide), poly(tetramethylphenylene sulfide), poly(butylcyclohexylphenylene sulfide), poly(hexyldodecylphenylene sulfide), poly(octadecyl-phenylene sulfide), poly(phenylphenylene sulfide), poly(tolylphenylene sulfide), poly(benzyl-phenylene sulfide), poly[octyl-4-(3-methylcyclopentyl)phenylene sulfide], and any combination thereof.

In an embodiment the poly(arylene sulfide) polymer comprises poly(phenylene sulfide) or PPS. In an aspect, PPS is a polymer comprising at least about 70, 80, 90, or 95 mole percent para-phenylene sulfide units. In another embodiment, the poly(arylene sulfide) can contain up to about 50, 70, 80, 90, 95, or 99 mole percent para-phenylene sulfide units. In some embodiments, PPS can contain from any minimum mole percent of the para-phenylene sulfide unit disclosed herein to any maximum mole percent of the para-phenylene sulfide unit disclosed herein; for example, from about 70 to about 99 mole percent, alternatively from about 70 to about 95 mole percent, or alternatively from about 80 to about 95 mole percent of the —(Ar—S)— unit. Other suitable ranges for the para-phenylene sulfide units will be readily apparent to one of skill in the art with the help of this disclosure. The structure for the para-phenylene sulfide unit can be represented by Formula II.

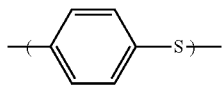

Formula II

In an embodiment, PPS can comprise up to about 30, 20, 10, or 5 mole percent of one or more units selected from ortho-phenylene sulfide groups, meta-phenylene sulfide groups, substituted phenylene sulfide groups, phenylene sulfone groups, substituted phenylene sulfide groups, or groups having the following structures:

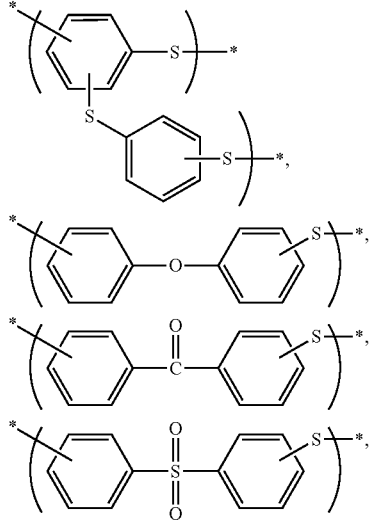

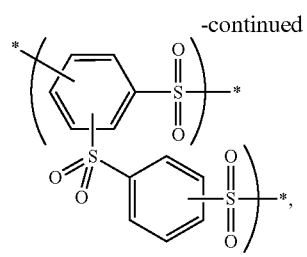

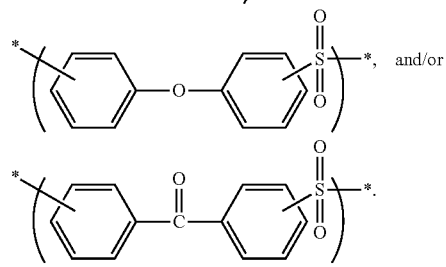

In other embodiments, PPS can comprise up to about 30, 20, 10, or 5 mole percent of units having one or more of the following structures:

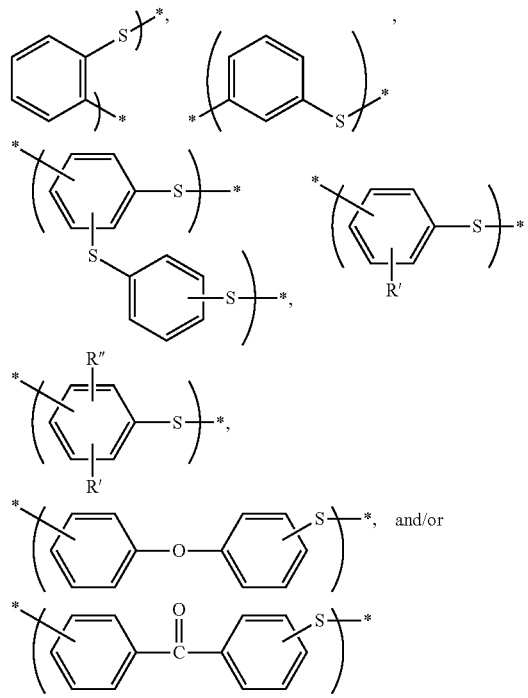

wherein R' and R" can be independently selected from any arylene substituent group disclosed herein for a poly(arylene sulfide). In other embodiments, PPS can comprise up to about 30, 20, 10, or 5 mole percent of units having one or more of the following structures:

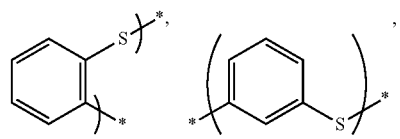

-continued

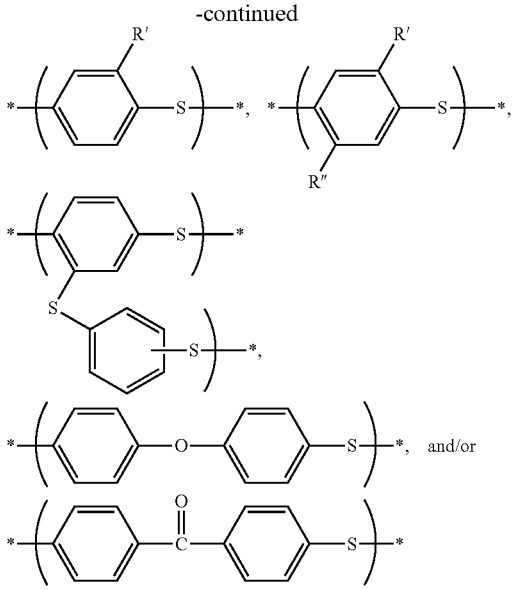

wherein R' and R" can be independently selected from any arylene substituent group disclosed herein for a poly(arylene sulfide). In other embodiments, PPS can comprise up to about 30, 20, 10, or 5 mole percent of units having one or more of the following structures:

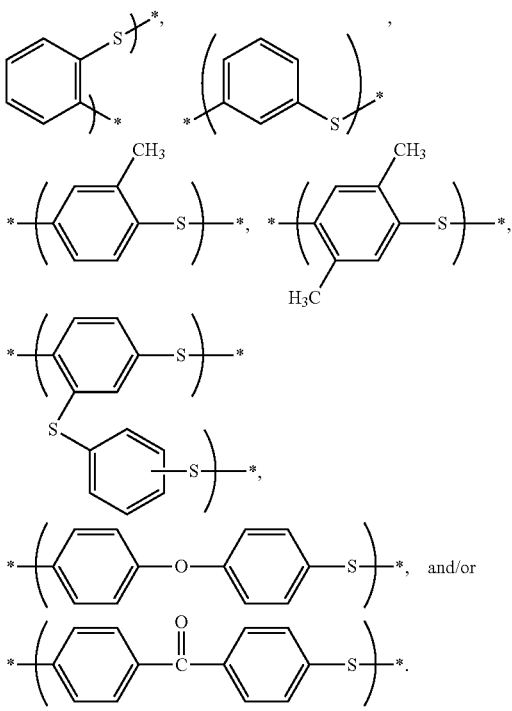

The PPS molecular structure can readily form a thermally stable crystalline lattice, giving PPS a semi-crystalline morphology with a high crystalline melting point ranging from about 265° C. to about 315° C. Because of its molecular structure, PPS also can tend to char during combustion, making the material inherently flame resistant. Further, PPS may not typically dissolve in solvents at temperatures below about 200° C.

PPS is manufactured and sold under the trade name Ryton® PPS by Chevron Phillips Chemical Company LP of The Woodlands, Tex. Other sources of poly(phenylene sulfide) include Ticona, Toray, and Dainippon Ink and Chemicals, Incorporated, among others.

Generally, a poly(arylene sulfide) can be produced by contacting at least one halogenated aromatic compound having two halogens, a sulfur compound, and a polar organic compound to form the poly(arylene sulfide). In an embodiment, the process to produce the poly(arylene sulfide) can further comprise recovering the poly(arylene sulfide). In some embodiments, the polyarylene sulfide can be formed under polymerization conditions capable of producing the poly(arylene sulfide). In an embodiment, the poly(arylene sulfide) can be produced in the presence of a halogenated aromatic compound having greater than two halogen atoms (e.g., 1,2,4,-trichlorobenzene, among others).

Similarly, PPS can be produced by contacting at least one para-dihalobenzene compound, a sulfur compound, and a polar organic compound to form the PPS. In an embodiment, the process to produce the PPS can further comprise recovering the PPS. In some embodiments, the PPS can be formed under polymerization conditions capable of forming the PPS. When producing PPS, other dihaloaromatic compounds can also be present so long as the produced PPS conforms to the PPS desired features. For example, in an embodiment, the PPS can be prepared utilizing substituted para-dihalobenzene compounds and/or halogenated aromatic compounds having greater than two halogen atoms (e.g., 1,2,4-trichlorobenzene or substituted or a substituted 1,2,4-trichlorobenzene, among others). Methods of PPS production are described in more detail in U.S. Pat. Nos. 3,919,177; 3,354,129; 4,038,261; 4,038,262; 4,038,263; 4,064,114; 4,116,947; 4,282,347; 4,350,810; and 4,808,694; each of which is incorporated by reference herein in its entirety.

In an embodiment, halogenated aromatic compounds having two halogens which can be employed to produce the poly(arylene sulfide) can be represented by Formula III.

Formula III

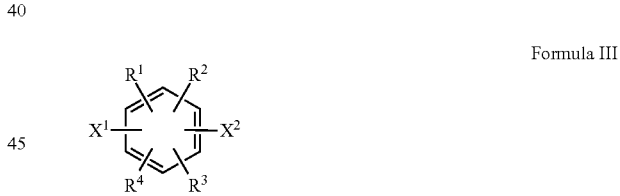

In an embodiment, $X^1$ and $X^2$ independently can be a halogen. In some embodiments, each $X^1$ and $X^2$ independently can be fluorine, chlorine, bromine, iodine; alternatively, chlorine, bromine, or iodine; alternatively, chlorine; alternatively, bromine; or alternatively, iodine. $R^1$, $R^2$, $R^3$ and $R^4$ have been described previously herein for the poly(arylene sulfide) having Formula I. Any aspect and/or embodiment of these $R^1$, $R^2$, $R^3$, and $R^4$ descriptions can be utilized without limitation to describe the halogenated aromatic compounds having two halogens represented by Formula III. It should be understood, that for producing poly(arylene sulfide)s, the relationship between the position of the halogens $X^1$ and $X^2$ can be ortho, meta, para, or any combination thereof; alternatively, ortho; alternatively, meta; or alternatively, para. Examples of halogenated aromatic compounds having two halogens that can be utilized to produce a poly(arylene sulfide) can include, but not limited to, dichlorobenzene (ortho, meta, and/or para), dibromobenzene (ortho, meta, and/or para), diiodobenzene (ortho, meta, and/or para), chlorobromobenzene (ortho, meta, and/or para), chloroiodobenzene (ortho, meta, and/or para), bromoiodobenzene (ortho, meta, and/or para), dichlorotoluene, dichloroxylene, ethylisopropyldibromobenzene, tetramethyldichlorobenzene, butylcyclohexyldibromobenzene, hexyldodecyldichlorobenzene, octadecyldiiodobenzene, phenylchlorobromobenzene, tolyldibromobenzene, benzyldichloro-benzene, octylmethylcyclopentyldichlorobenzene, or any combination thereof.

The para-dihalobenzene compound which can be utilized to produce poly(phenylene sulfide) can be any para-dihalobenzene compound. In an embodiment, para-dihalobenzenes that can be used in the synthesis of PPS can be, comprise, or consist essentially of, p-dichlorobenzene, p-dibromobenzene, p-diiodobenzene, 1-chloro-4-bromobenzene, 1-chloro-4-iodobenzene, 1-bromo-4-iodobenzene, or any combination thereof. In some embodiments, the para-dihalobenzene that can be used in the synthesis of PPS can be, comprise, or consist essentially of, p-dichlorobenzene.

In some embodiments, the synthesis of the PPS can further include 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, or combinations thereof.

Without wishing to be limited by theory, sulfur sources which can be employed in the synthesis of the poly(arylene sulfide) can include thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, hydrogen sulfide, or any combination thereof. In an embodiment, an alkali metal sulfide can be used as the sulfur source. Alkali metal sulfides suitable for use in the present disclosure can be, comprise, or consist essentially of, lithium sulfide, sodium sulfide, sodium hydrosulfide (NaSH), potassium sulfide, rubidium sulfide, cesium sulfide, or any combination thereof. In some embodiments, the alkali metal sulfides that can be employed in the synthesis of the poly(arylene sulfide) can be an alkali metal sulfide hydrate or an aqueous alkali metal sulfide solution; alternatively, an alkali metal sulfide hydrate; or alternatively, an aqueous alkali metal sulfide solution. Aqueous alkali metal sulfide solution can be prepared by any suitable methodology. In an embodiment, the aqueous alkali metal sulfide solution can be prepared by the reaction of an alkali metal hydroxide with an alkali metal bisulfide in water; or alternatively, prepared by the reaction of an alkali metal hydroxide with hydrogen sulfide ($H_2S$) in water. Other sulfur sources suitable for use in the present disclosure are described in more detail in U.S. Pat. No. 3,919,177, which is incorporated by reference herein in its entirety.

In an embodiment, a process for the preparation of poly (arylene sulfide) can utilize a sulfur source which can be, comprise, or consist essentially of, an alkali metal bisulfide. In such embodiments, a reaction mixture for preparation of the poly(arylene sulfide) can comprise a base. In such embodiments, alkali metal hydroxides, such as sodium hydroxide (NaOH) can be utilized. In such embodiments, it can be desirable to reduce the alkalinity of the reaction mixture prior to termination of the polymerization reaction. Without wishing to be limited by theory, a reduction in alkalinity of the reaction mixture can result in the formation of a reduced amount of ash-causing polymer structures. The alkalinity of the reaction mixture can be reduced by any suitable methodology, for example by the addition of an acidic solution prior to termination of the polymerization reaction.

In an embodiment, the sulfur source suitable for use in the production of poly(arylene sulfide) can be prepared by combining sodium hydrosulfide (NaSH) and sodium hydroxide (NaOH) in an aqueous solution followed by dehydration (or alternatively by combining an alkali metal hydroxide with hydrogen sulfide ($H_2S$)). The production of $Na_2S$ in this manner can be considered to be an equilibrium reaction between $Na_2S$ and water ($H_2O$) and NaSH and NaOH according to the following equation.

$Na_2S + H_2O \rightleftharpoons NaSH + NaOH$

The resulting sulfur source can be referred to as sodium sulfide ($Na_2S$). In another embodiment, the production of $Na_2S$ can be performed in the presence of the polar organic solvent, e.g., N-methyl-2-pyrrolidone (NMP), among others disclosed herein. Without being limited to theory, when the sulfur compound (e.g., sodium sulfide) is prepared by reacting NaSH with NaOH in the presence of water and N-methyl-2-pyrrolidone, the N-methyl-2-pyrrolidone can also react with the sodium hydroxide (e.g., aqueous sodium hydroxide) to produce a mixture containing sodium hydrosulfide and sodium N-methyl-4-aminobutanoate (SMAB). Stoichiometrically, the overall reaction equilibrium may appear to follow the equation:

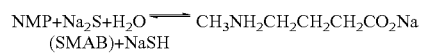

$NMP + Na_2S + H_2O \rightleftharpoons CH_3NH_2CH_2CH_2CH_2CO_2Na$ (SMAB) + NaSH However, it should be noted that this equation is a simplification and, in actuality, the equilibrium between $Na_2S$, $H_2O$, NaOH, and NaSH, and the water-mediated ring opening of NMP by sodium hydroxide can be significantly more complex.

Polar organic compounds which can be utilized in the preparation of a poly(arylene sulfide) can comprise a polar organic compound which can function to keep the dihaloaromatic compounds, sulfur source, and growing poly(arylene sulfide) in solution during the polymerization. In an aspect, the polar organic compound can comprise, or consist essentially of, an amide, a lactam, a sulfone, or any combinations thereof; alternatively, an amide; alternatively, a lactam; or alternatively, a sulfone. In an embodiment, the polar organic compound can be, comprise, or consist essentially of, hexamethylphosphoramide, tetramethylurea, N,N'-ethylenedipyrrolidone, N-methyl-2-pyrrolidone, pyrrolidone, caprolactam, N-ethylcaprolactam, sulfolane, N,N'-dimethylacetamide, 1,3-dimethyl-2-imidazolidinone, low molecular weight polyamides, or combinations thereof. In an embodiment, the polar organic compound can be, comprise, or consist essentially of, N-methyl-2-pyrrolidone. Additional polar organic compounds suitable for use in the present disclosure are described in more detail in D. R. Fahey and J. F. Geibel, *Polymeric Materials Encyclopedia*, Vol. 8, (Boca Raton, CRC Press, 1996), pages 6506-6515, which is incorporated by reference herein in its entirety.

In an embodiment, processes for the preparation of a poly (arylene sulfide) can employ one or more additional reagents. For example, molecular weight modifying or enhancing agents such as alkali metal carboxylates, lithium halides, or water can be added or produced during polymerization. In an embodiment, a reaction mixture for preparation of a poly (arylene sulfide) can further comprise an alkali metal carboxylate.

Alkali metal carboxylates which can be employed include, without limitation, those having general formula $R'CO_2M$ where R' can be a $C_1$ to $C_{20}$ hydrocarbyl group, a $C_1$ to $C_{20}$ hydrocarbyl group, or a $C_1$ to $C_5$ hydrocarbyl group. In some embodiments, R' can be an alkyl group, a cycloalkyl group, an aryl group, aralkyl group; or alternatively, an alkyl group. Alkyl groups, cycloalkyl groups, aryl groups, aralkyl groups are disclosed herein (e.g., as options for $R^1$, $R^2$, $R^3$, and $R^4$ or a substituent groups). These alkyl groups, cycloalkyl groups, aryl groups, aralkyl groups can be utilized without limitation to further describe R' of the alkali metal carboxylates having the formula $R'CO_2M$. In an embodiment, M can be an alkali metal. In some embodiments, the alkali metal can be, comprise, or consist essentially of, lithium, sodium, potassium, rubidium, or cesium; alternatively lithium; alternatively, sodium; or alternatively, potassium. The alkali metal carboxylate can be employed as a hydrate; or alternatively, as a solution or dispersion in water. In an embodiment, the alkali metal carboxylate can be, comprise, or consist essentially of, sodium acetate (NaOAc or $NaC_2H_3O_2$).

General conditions for the production of poly(arylene sulfides) are generally described in U.S. Pat. Nos. 5,023,315; 5,245,000; 5,438,115; and 5,929,203; each of which is incorporated by reference herein in its entirety. Although specific mention can be made in this disclosure and the disclosures incorporated by reference herein to material produced using the "quench" termination process, it is contemplated that other processes (e.g., "flash" termination process) can be employed for the preparation of a poly(arylene sulfide). It is contemplated that a poly(arylene sulfide) obtained from a process other than the quench termination process can be suitably employed in the methods and compositions of this disclosure.

Generally, the ratio of reactants employed in the polymerization process to produce a poly(arylene sulfide) can vary widely. However, the typical equivalent ratio of the halogenated aromatic compound having two halogens to sulfur compound can be in the range of from about 0.8 to about 2; alternatively, from about 0.9 to about 1.5; or alternatively, from about 0.95 to about 1.3. The amount of polyhalo-substituted aromatic compound optionally employed as a reactant can be any amount to achieve the desired degree of branching to give the desired poly(arylene sulfide) melt flow. Generally, up to about 0.02 moles of polyhalo-substituted aromatic compound per mole of halogenated aromatic compound having two halogens can be employed. If an alkali metal carboxylate is employed as a molecular weight modifying agent, the mole ratio of alkali metal carboxylate to dihaloaromatic compound(s) can be within the range of from about 0.02 to about 4; alternatively, from about 0.05 to about 3; or alternatively, from about 0.1 to about 2.

The amount of polar organic compound employed in the process to prepare the poly(arylene sulfide) can vary over a wide range during the polymerization. However, the molar ratio of polar organic compound to the sulfur compound is typically within the range of from about 1 to about 10. If a base, such as sodium hydroxide, is contacted with the polymerization reaction mixture, the molar ratio is generally in the range of from about 0.5 to about 4 moles per mole of sulfur compound.

The components of the reaction mixture can be contacted with each other in any order. Some of the water, which can be introduced with the reactants, can be removed prior to polymerization. In some instances, the water can be removed in a dehydration process. For example, in instances where a significant amount of water is present (e.g., more than about 0.3 moles of water per mole of sulfur compound) water can be removed in a dehydration process. The temperature at which the polymerization can be conducted can be within the range of from about 170° C. (347° F.) to about 450° C. (617° F.); or alternatively, within the range of from about 200° C. (392° F.) to about 285° C. (545° F.). The reaction time can vary widely, depending, in part, on the reaction temperature, but is generally within the range of from about 10 minutes to about 3 days; or alternatively, within a range of from about 1 hour to about 8 hours. The reactor pressure need be only sufficient to maintain the polymerization reaction mixture substantially in the liquid phase. Such pressure will can be in the range of from about 0 psig to about 400 psig; alternatively, in the range of from about 30 psig to about 300 psig; or alternatively, in the range of from about 100 psig to about 250 psig.

The polymerization can be terminated by cooling the reaction mixture (removing heat) to a temperature below that at which substantial polymerization takes place. In some instances the cooling of the reaction mixture also begins the process to recover the poly(arylene sulfide) as the poly(arylene sulfide) can precipitate from solution at temperatures less than about 235° C. Depending upon the polymerization features (temperature, solvent(s), and water quantity, among other features) and the methods employed to cool the reaction mixture, the poly(arylene sulfide) can begin to precipitate from the reaction solution at a temperature ranging from about 235° C. to about 185° C. Generally, poly(arylene sulfide) precipitation can impede further polymerization.

The poly(arylene sulfide) reaction mixture can be cooled using a variety of methods. In an embodiment, the polymerization can be terminated by the flash evaporation of the solvent (e.g., the polar organic compound, water, or a combination thereof) from the poly(arylene sulfide) reaction mixture. Processes for preparing poly(arylene sulfide) utilizing solvent flash evaporation to terminate the reaction can be referred to as a flash termination process. In other embodiments, the polymerization can be terminated by adding a liquid comprising, or consisting essentially of, 1) water, 2) polar organic compound, or 3) a combination of water and polar organic compound (alternatively water; or alternatively, polar organic compound) to the poly(arylene sulfide) reaction mixture and cooling the poly(arylene sulfide) reaction mixture. In yet other embodiments, the polymerization can be terminated by a solvent(s) other than water or the polar organic compound to the poly(arylene sulfide) reaction mixture and cooling the poly(arylene sulfide) reaction mixture. Processes for preparing poly(arylene sulfide) which utilize the addition of water, polar organic compound, and/or other solvent(s) to terminate the reaction can be referred to as a quench termination process. The cooling of the reaction mixture can be facilitated by the use of reactor jackets or coil. Another method for terminating the polymerization can include contacting the reaction mixture with a polymerization inhibiting compound. It should be noted that termination of the polymerization does not imply that complete reaction of the polymerization components has occurred. Moreover, termination of the polymerization is not meant to imply that no further polymerization of the reactants can take place. Generally, for economic reasons, termination (and poly(arylene sulfide) recovery) can be initiated at a time when polymerization is substantially complete or when further reaction would not result in a significant increase in polymer molecular weight.

Once the poly(arylene sulfide) has precipitated from solution, a particulate poly(arylene sulfide) can be recovered from the reaction mixture slurry by any process capable of separating a solid precipitate from a liquid. It should be noted, that the process to produce the poly(arylene sulfide) can form a by-product alkali metal halide. The by-product alkali metal halide can be removed during process steps utilized to recover the poly(arylene sulfide). Procedures which can be utilized to recover the poly(arylene sulfide) from the reaction mixture slurry can include, but are not limited to, i) filtration, ii) washing the poly(arylene sulfide) with a liquid (e.g., water), or iii) dilution of the reaction mixture with liquid (e.g., water) followed by filtration and washing the poly(arylene sulfide) with a liquid (e.g., water). For example, in a non-limiting embodiment, reaction mixture slurry can be filtered to recover the precipitated poly(arylene sulfide) and the recovered precipitate (containing poly(arylene sulfide) and by-product alkali metal halide) can be slurried in a liquid (e.g., water) and subsequently filtered to remove the alkali metal halide by-product (and/or other liquid soluble impurities). Generally, the steps of slurring the poly(arylene sulfide) with a liquid followed by filtration to recover the poly(arylene sulfide) can occur as many times as necessary to obtain a desired level of poly(arylene sulfide) purity.

In an embodiment, the polar organic compound can also be recovered at the end of the polymerization process. For example, if the poly(arylene sulfide) is being recovered by filtration, the filtrate (e.g., the liquid phase in the filtration process) can comprise the polar organic compound. Such filtrate can be subjected to a liquid-liquid extraction process for the recovery of the polar organic compound. For example, when the polar organic compound is NMP, the filtrate can be treated with an alcohol (e.g., 1-hexanol), and the NMP can be recovered in the phase comprising the alcohol (e.g., 1-hexanol). The recovered NMP can be recycled/reused in a subsequent polymerization process for producing a poly(arylene sulfide).

In an aspect, the poly(arylene sulfide) described herein can further be processed by melt processing. In an embodiment, melt processing can generally be any process, step(s) which can render the poly(arylene sulfide) in a soft or "moldable state." In an embodiment, the melt processing can be a step wherein at least part of the polymer composition or mixture subjected to the process is in molten form. In some embodiments, the melt processing can be performed by melting at least part of the polymer composition or mixture. In some embodiments, the melt processing step can be performed with externally applied heat. In other embodiments, the melt processing step itself can generate the heat necessary to melt (or partially melt) the mixture, polymer, or polymer composition. In an embodiment, the melt processing step can be an extrusion process, a melt kneading process, or a molding process. In some embodiments, the melt processing step of any method described herein can be an extrusion process; alternatively, a melt kneading process; or alternatively, a molding process. It should be noted, that when any process described herein employs more than one melt processing step, that each melt process step is independent of each other and thus each melt processing step can use the same or different melt processing method. Other melt processing methods are known to those having ordinary skill in the art can be utilized as the melt processing step.

The poly(arylene sulfide) can be formed or molded into a variety of components or products for a diverse range of applications and industries. For example, the poly(arylene sulfide) can be heated and molded into desired shapes and composites in a variety of processes, equipment, and operations. For example, the poly(arylene sulfide) can be subjected to heat, compounding, injection molding, blow molding, precision molding, film-blowing, extrusion, and so forth. Additionally, additives, such as those mentioned herein, can be blended or compounded within the poly(arylene sulfide). The output of such techniques can include, for example, polymer intermediates or composites including the poly(arylene sulfide), and manufactured product components or pieces formed from the poly(arylene sulfide), and so on. These manufactured components can be sold or delivered directly to a user. On the other hand, the components can be further processed or assembled in end products, for example, in the industrial, consumer, automotive, aerospace, solar panel, and electrical/electronic industries, which may need polymers that have conductivity, high strength, and high modulus, among other properties. Some examples of end products include without limitation synthetic fibers, textiles, filter fabric for coal boilers, papermaking felts, electrical insulation, specialty membranes, gaskets, and packing materials.

In an embodiment, a method of the present disclosure comprises contacting a poly(arylene sulfide) composition with a thiophenol removing agent (e.g., an $\alpha,\beta$-unsaturated compound) to reduce the concentration of thiophenol therein. For purposes of the disclosure herein, the concentration or amount of thiophenol present in a poly(arylene sulfide) composition refers to the amount of "free thiophenol," e.g., unreacted thiophenol or thiophenol that has not reacted with a thiophenol removing agent (e.g., an $\alpha,\beta$-unsaturated compound). In an embodiment, a poly(arylene sulfide) composition prior to treatment comprises a measurable amount of thiophenol or free thiophenol. In such an embodiment, during treatment (e.g., reacting with a thiophenol removing agent), an amount of the free thiophenol of the poly(arylene sulfide) composition may react with the thiophenol removing agent (e.g., an $\alpha,\beta$-unsaturated compound) and form a thiophenol reaction product, such as for example a reaction product comprising bound thiophenol, covalently bound thiophenol, sequestered thiophenol, etc. Such thiophenol reaction product may or may not be removed from the poly(arylene sulfide) composition. For purposes of the disclosure herein, the amount of thiophenol converted into a thiophenol reaction product is deemed to be considered "removed" from the poly(arylene sulfide) composition and have the thiophenol concentration or amount "reduced" therein, irrespective of the physical removal of the thiophenol reaction product from the poly(arylene sulfide) composition. Further, for purposes of the disclosure herein, the terms "reduce the amount of" and/or "reduce the concentration of" thiophenol do not necessarily imply the physical removal of a thiophenol reaction product from the poly(arylene sulfide) composition. The methods of this disclosure comprise removing an amount of thiophenol from a poly(arylene sulfide) composition, either physically or by a chemical reaction (e.g., reaction with a thiophenol removing agent), and collectively these methods are referred to as "reduction in concentration" or "reduction in amount" of thiophenol, whether or not any thiophenol reaction product is removed from the poly(arylene sulfide) composition. For purposes of the disclosure herein, a % reduction in thiophenol in a poly(arylene sulfide) composition may be calculated according to equation 1:

$$\% \text{ reduction} = \frac{c_{Ti} - c_{Tf}}{c_{Ti}} \times 100 \tag{1}$$

wherein $c_{Ti}$, is the concentration of thiophenol in the poly (arylene sulfide) composition prior to treatment or the initial concentration of thiophenol in the poly(arylene sulfide) composition; and $c_{Tf}$ is the concentration of thiophenol in the treated poly(arylene sulfide) composition or the final concentration of thiophenol in the poly(arylene sulfide) composition.

In an embodiment, the poly(arylene sulfide) composition comprises a poly(arylene sulfide) polymer, a polar organic compound, and thiophenol. In an embodiment, a method of the present disclosure comprises contacting the poly(arylene sulfide) composition with the thiophenol removing agent (e.g., an α,β-unsaturated compound) in a batch polymerization reactor, upon completion of the poly(arylene sulfide) polymerization reaction. In an alternative embodiment, a method of the present disclosure comprises contacting the poly(arylene sulfide) composition with the thiophenol removing agent (e.g., an α,β-unsaturated compound) in a batch polymerization reactor, while the polymerization reaction of the poly(arylene sulfide) is ongoing. In another embodiment, a method of the present disclosure comprises contacting the poly(arylene sulfide) composition with the thiophenol removing agent (e.g., an α,β-unsaturated compound) in a continuous polymerization reactor, such as for example by co-feeding the thiophenol removing agent (e.g., an α,β-unsaturated compound) into one of the polymerization reactor feedstreams. In yet another embodiment, a fluid stream comprising the poly(arylene sulfide) composition is recovered from the polymerization reactor (e.g., an effluent stream) and such fluid stream is contacted with the thiophenol removing agent (e.g., an α,β-unsaturated compound, for example in a continuous or batch manner. In some embodiments, the poly(arylene sulfide) composition can be removed from the polymerization reactor and stored prior to contacting with the thiophenol removing agent (e.g., an α,β-unsaturated compound).

Without wishing to be limited by theory, it is believed that when the thiophenol removing agent (e.g., the α,β-unsaturated compound) is contacted with a composition comprising a polar organic compound and a polymer particulate, the thiophenol removing agent (e.g., the α,β-unsaturated compound) can react with and preferentially remove the thiophenol present in the polar organic compound (e.g., NMP).

In alternative embodiments, one or more separation steps of one or more components of the poly(arylene sulfide) composition can be carried out prior to, concurrent with, and/or subsequent to treatment to reduce the amount of thiophenol in the poly(arylene sulfide) composition. In an embodiment, the poly(arylene sulfide) polymer can be separated out from the polar organic compound by using any suitable separation method. Nonlimiting examples of separation methods suitable for use in this disclosure include flushing or screening off the polar organic compound (e.g., NMP) from the reactor product to recover the poly(arylene sulfide) polymer; vaporizing the solvent (e.g., flashing) to remove the solvent from the polymer; and solid-liquid separation of the poly(arylene sulfide) polymer as a solid phase from the polar organic compound (e.g., NMP) as a liquid phase through separation techniques such as decantation, filtration, centrifugation, etc.

As will be appreciated by one of skill in the art, any treatment and separation sequence compatible with the methods of this disclosure can be used. Nonlimiting examples of treatment and separation sequences include separating one or more components of the poly(arylene sulfide) composition and then treating the separated components; treating the poly(arylene sulfide) composition and then separating one or more components of the poly(arylene sulfide) composition; etc.

In an embodiment, the poly(arylene sulfide) composition can be first contacted with the thiophenol removing agent (e.g., an α,β-unsaturated compound), and then one or more components of the poly(arylene sulfide) composition can be separated. For example, the poly(arylene sulfide) composition can be contacted with the thiophenol removing agent (e.g., an α,β-unsaturated compound) inside the polymerization reactor, and then the treated polar organic compound (e.g., NMP) can be flushed out of the reactor, leaving the treated poly(arylene sulfide) polymer inside the reactor.

In an embodiment, one or more components of the poly(arylene sulfide) composition can be first separated, and then contacted with the thiophenol removing agent (e.g., an α,β-unsaturated compound). In an embodiment, a separated component, such as for example separated poly(arylene sulfide) polymer and/or separated polar organic compound (e.g., NMP), can be contacted with a thiophenol removing agent (e.g., an α,β-unsaturated compound) in a separation vessel, or downstream of a separation vessel. In another embodiment, the components (e.g., poly(arylene sulfide) polymer and polar organic compound (e.g., NMP)) can be removed from the polymerization reactor, optionally stored, separated into two or more streams (e.g., a separated PPS polymer stream and a separated NMP solvent stream), and then contacted with the thiophenol removing agent (e.g., an α,β-unsaturated compound).

In an embodiment, the separated and treated components of the poly(arylene sulfide) composition (e.g., separated and treated poly(arylene sulfide) polymer and/or separated and treated polar organic compound (e.g., NMP)) can be further stored and/or used in any suitable application. For example, the separated and treated organic polar compound (e.g., NMP) can be further stored, used in any suitable application, and/or recycled/reused in a process for producing a poly(arylene sulfide) polymer, as previously described herein.

In an embodiment, the polymerization conditions for the production of a poly(arylene sulfide) polymer can be such that an undesirable amount of thiophenol is produced during the polymerization process. An example of such polymerization conditions includes, but is not limited to, a halogenated aromatic compound (e.g., a dichlorobenzene) to sulfur compound molar ratio that is less than stoichiometric. Such a less than stoichiometric molar ratio can have numerous causes, such as for example, an irregular charge of reactants to the reactor or excessive reaction time, which can cause side reactions that can convert the halogenated aromatic compound having two halogens to non-reactive species. Without wishing to be limited by theory, thiophenol can act as a chain termination agent in a polymerization reaction for the production of a poly(arylene sulfide) polymer, and thus can lead to a poly(arylene sulfide) polymer with shorter polymer chains and lower molecular weight than for polymers obtained under similar conditions, but in the absence of thiophenol.

In an embodiment, the process for preparing a poly(arylene sulfide) polymer can produce a poly(arylene sulfide) composition comprising a poly(arylene sulfide) polymer, a polar organic compound (e.g., NMP), and thiophenol. The thiophenol may be present in an undesirable amount in the poly(arylene sulfide) composition. An undesirable amount of thiophenol can be any amount of thiophenol present in the poly(arylene sulfide) composition in an amount of equal to or greater than about 1 wt. %; alternatively greater than about 5 wt. %; alternatively greater than about 10 wt. %; alternatively greater than about 15 wt. %; alternatively greater than about 20 wt. %; alternatively greater than about 25 wt. %; alternatively greater than about 30 wt. %; or alternatively greater than about 35 wt. %; based on the total weight of the polar organic compound (e.g., NMP).

In an embodiment, the poly(arylene sulfide) composition can be contacted with a thiophenol removing agent (e.g., an α,β-unsaturated compound), as previously described herein. In such an embodiment, the treated poly(arylene sulfide) composition can comprise an acceptable amount of thiophenol, in an amount of less than about 1 wt. %; alternatively less than about 0.5 wt. %; alternatively less than about 0.1 wt. %; alternatively less than about 0.05 wt. %; alternatively less than about 0.01 wt. %; or alternatively less than about 0.005 wt. %; based on the total weight of the polar organic compound (e.g., NMP). In an embodiment, contacting the poly (arylene sulfide) composition with a thiophenol removing agent (e.g., an α,β-unsaturated compound) can result in an about 85% reduction in thiophenol, alternatively about 95% reduction in thiophenol, or alternatively about 99% reduction in thiophenol.

In an embodiment, a thiophenol removing agent comprises a compound having a carbon-carbon double-bond. In such an embodiment, the compound having a carbon-carbon double-bond which can be utilized as the thiophenol removing agent is selected from an α,β-unsaturated ester, an α,β-unsaturated amide, an α,β-unsaturated ketone, or any combination thereof. In some embodiments, the thiophenol removing agent can comprise, consist essentially of, or consist of, an α,β-unsaturated ester, an α,β-unsaturated amide, an α,β-unsaturated ketone, or any combination thereof; alternatively, an α,β-unsaturated ester; alternatively, an α,β-unsaturated amide; or alternatively, an α,β-unsaturated ketone.

Without wishing to be limited by theory, the thiophenol removing agent can remove the thiophenol by engaging the thiophenol in a thiol-ene type reaction. Further, without wishing to be limited by theory, a thiol-ene reaction can be generally defined as the addition reaction of a S—H bond across a carbon-carbon double or triple bond.

In an embodiment, treating a poly(arylene sulfide) composition with a thiophenol removing agent (e.g., an α,β-unsaturated compound) can result in a thiol-ene reaction product or a thiophenol reaction product. In such an embodiment, the thiol-ene reaction product or the thiophenol reaction product can be removed from the treated poly(arylene sulfide) composition by using any suitable methodology (e.g., separation, filtration, extraction, etc.), as will be apparent to one of skill in the art and with the help of this disclosure.

In an embodiment, a thiophenol removing agent (e.g., an α,β-unsaturated compound) can be contacted with a poly (arylene sulfide) composition comprising thiophenol in a stoichiometric ratio of at least 1 stoichiometric equivalent of the thiophenol removing agent, alternatively at least 1.5 stoichiometric equivalents of the thiophenol removing agent, or alternatively at least 2 stoichiometric equivalents of the thiophenol removing agent, per equivalent of thiophenol present in the poly(arylene sulfide) composition.

In an embodiment, a thiophenol removing agent (e.g., an α,β-unsaturated compound) can be contacted with a poly (arylene sulfide) composition comprising thiophenol at a temperature of equal to or less than about 200° C., alternatively from about 20° C. to about 200° C., alternatively from about 20° C. to about 150° C., alternatively from about 20° C. to about 100° C., or alternatively from about 20° C. to about 50° C.

In an embodiment, the α,β-unsaturated ester, the α,β-unsaturated amide or the α,β-unsaturated ketone can have at least one ester group, one amide group, or one ketone group attached to the carbon-carbon double bond; alternatively, at least two ester groups, amide groups, or ketone groups attached to the carbon-carbon double bond. In some embodiments, the α,β-unsaturated ester, the α,β-unsaturated amide, or the α,β-unsaturated ketone has only one ester group, amide group, or ketone group attached to the carbon-carbon double bond; alternatively, has only two ester groups, amide groups, or ketone groups attached to the carbon-carbon double bond.

In an embodiment, the α,β-unsaturated ester can be a $C_4$ to $C_{30}$ α,β-unsaturated ester, alternatively, a $C_6$ to $C_{20}$ 4-unsaturated ester, alternatively, or alternatively, a $C_{10}$ to $C_{15}$ α,β-unsaturated ester. When the α,β-unsaturated ester has only one ester group attached to the carbon-carbon double bond, the compound can be an acrylate. In some embodiments, the α,β-unsaturated ester compound can comprise a group having Structure A1:

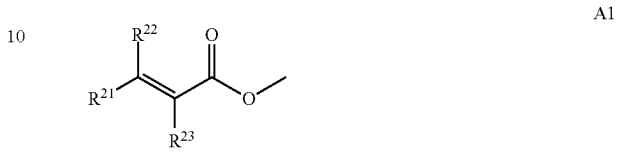

where the undesignated valency represents the remainder of the Structure A1. In an aspect, $R^{21}$, $R^{22}$, and $R^{23}$ of the group A1 can be H, an organyl group, or a hydrocarbyl group; alternatively, H or an organyl group; or alternatively, H or a hydrocarbyl group. Organyl and hydrocarbyl group have been previously described herein and can be utilized, without limitation, to further describe $R^{21}$, $R^{22}$, and $R^{23}$ of the α,β-unsaturated ester comprising Structure A1 which can be present in the α,β-unsaturated ester compounds which can be utilized as thiophenol removing agents. In some particular non-limiting embodiments, $R^{21}$, $R^{22}$, and $R^{23}$ are H (an acrylate), $R^{21}$ and $R^{22}$ are H and $R^{23}$ is a methyl group (a methacrylate), or a combination thereof; alternatively, $R^{21}$, $R^{22}$, and $R^{23}$ are H (an acrylate); or alternatively, $R^{21}$ and $R^{22}$ are H and $R^{23}$ is a methyl group (a methacrylate). When an α,β-unsaturated ester molecule comprises two or more A1 groups, the additional A1 groups can be located within $R^{21}$, $R^{22}$, $R^{23}$, or the undesignated oxygen valency. In some particular embodiments, when the α,β-unsaturated ester molecule comprises two or more A1 groups, the additional A1 groups can be located within the undesignated oxygen valency.

Various aspects and embodiments described herein refer to substituents or substituent groups. In an embodiment, each $R^{21}$, $R^{22}$, and $R^{23}$ substituent group of any aspect or embodiment calling for a substituent independently can be a halide, a hydrocarbyl group, or a hydrocarboxy group; alternatively, a halide or a hydrocarbyl group; alternatively, a halide or a hydrocarboxy group; alternatively, a hydrocarbyl group or a hydrocarboxy group; alternatively, a halide; alternatively, a hydrocarbyl group; or alternatively, a hydrocarboxy group. In some embodiments, each $R^{21}$, $R^{22}$, and $R^{23}$ substituent group of any aspect or embodiment calling for a substituent independently can be a halide, a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group. In other embodiments, each $R^{21}$, $R^{22}$, and $R^{23}$ substituent group of any aspect or embodiment calling for a substituent independently can be a halide, a $C_1$ to $C_5$ hydrocarbyl group, or a $C_1$ to $C_5$ hydrocarboxy group; alternatively, a halide or a $C_1$ to $C_5$ hydrocarbyl group; alternatively, a halide or a $C_1$ to $C_5$ hydrocarboxy group; alternatively, a $C_1$ to $C_5$ hydrocarbyl group or a $C_1$ to $C_5$ hydrocarboxy group; alternatively, a halide; alternatively, a $C_1$ to $C_5$ hydrocarbyl group; or alternatively, a $C_1$ to $C_5$ hydrocarboxy group.

In an embodiment, any halide substituent of any aspect or embodiment calling for a substituent can be a fluoride, chloride, bromide, or iodide; alternatively, a fluoride or chloride.

In some embodiments, any halide substituent of any aspect or embodiment calling for a substituent can be a fluoride; alternatively, a chloride; alternatively, a bromide; or alternatively, an iodide.

In an embodiment, any hydrocarbyl substituent of any aspect or embodiment calling for a substituent can be an alkyl group, an aryl group, or an aralkyl group; alternatively, an alkyl group; alternatively, an aryl group; or alternatively, an aralkyl group. In an embodiment, any alkyl substituent of any aspect or embodiment calling for a substituent can be a methyl group, an ethyl group, an n-propyl group, an isopropyl group, an n-butyl group, a sec-butyl group, an isobutyl group, a tert-butyl group, an n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group; alternatively, a methyl group, an ethyl group, an isopropyl group, a tert-butyl group, or a neo-pentyl group; alternatively, a methyl group; alternatively, an ethyl group; alternatively, an isopropyl group; alternatively, a tert-butyl group; or alternatively, a neo-pentyl group. In an embodiment, any aryl substituent of any aspect or embodiment calling for a substituent can be phenyl group, a tolyl group, a xylyl group, or a 2,4,6-trimethylphenyl group; alternatively, a phenyl group; alternatively, a tolyl group; alternatively, a xylyl group; or alternatively, a 2,4,6-trimethylphenyl group. In an embodiment, any aralkyl substituent of any aspect or embodiment calling for a substituent can be benzyl group or an ethylphenyl group (2-phenyleth-1-yl or 1-phenyleth-1-yl); alternatively, a benzyl group; alternatively, an ethylphenyl group; alternatively, a 2-phenyleth-1-yl group; or alternatively, a 1-phenyleth-1-yl group.

In an embodiment, any hydrocarboxy substituent of any aspect or embodiment calling for a substituent can be an alkoxy group, an aryloxy group, or an aralkoxy group; alternatively, an alkoxy group; alternatively, an aryloxy group, or an aralkoxy group. In an embodiment, any alkoxy substituent of any aspect or embodiment calling for a substituent can be a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, or a neo-pentoxy group; alternatively, a methoxy group, an ethoxy group, an isopropoxy group, a tert-butoxy group, or a neo-pentoxy group; alternatively, a methoxy group; alternatively, an ethoxy group; alternatively, an isopropoxy group; alternatively, a tert-butoxy group; or alternatively, a neo-pentoxy group. In an embodiment, any aryloxy substituent of any aspect or embodiment calling for a substituent can be phenoxy group, a toloxy group, a xyloxy group, or a 2,4,6-trimethylphenoxy group; alternatively, a phenoxy group; alternatively, a toloxy group; alternatively, a xyloxy group; or alternatively, a 2,4,6-trimethylphenoxy group. In an embodiment, any aralkoxy substituent of any aspect or embodiment calling for a substituent can be benzoxy group.

In an embodiment, the α,β-unsaturated ester composition can comprise, consist essentially of, or consist of, an α,β-unsaturated ester having at least 2 α,β-unsaturated ester groups having structure A1. In some embodiments, the α,β-unsaturated ester composition can comprise, consist essentially of, or consist of, an α,β-unsaturated ester having at least 3 α,β-unsaturated ester groups having structure A1. In some embodiments, the α,β-unsaturated ester composition can comprise, consist essentially of, or consist of, a mixture of α,β-unsaturated ester molecules having structure A1. When the α,β-unsaturated ester composition comprises, consists essentially of, or consists of, a mixture of α,β-unsaturated ester molecules, the α,β-unsaturated ester molecules can have an average of at least 1.5 α,β-unsaturated ester groups having structure A1 per α,β-unsaturated ester molecule; alternatively, an average of at least 2 α,β-unsaturated ester groups having structure A1 per α,β-unsaturated ester molecule; alternatively, an average of at least 2.54 α,β-unsaturated ester groups having structure A1 per α,β-unsaturated ester molecule; or alternatively, an average of at least 3 α,β-unsaturated ester groups having structure A1 per α,β-unsaturated ester molecule. In some embodiments, the α,β-unsaturated ester molecules can have an average of from 1.5 to 12 α,β-unsaturated ester groups having structure A1 per α,β-unsaturated ester molecule; alternatively, an average of from 1.5 to 9 α,β-unsaturated ester groups having structure A1 per α,β-unsaturated ester molecule; alternatively, an average of from 2 to 7 α,β-unsaturated ester groups having structure A1 per α,β-unsaturated ester molecule; alternatively, an average of from 2 to 5 α,β-unsaturated ester groups having structure A1 per α,β-unsaturated ester molecule; or alternatively, an average of from 2 to 4 α,β-unsaturated ester groups having structure A1 per α,β-unsaturated ester molecule.

The α,β-unsaturated ester(s) comprising the α,β-unsaturated ester composition can be described as an ester of an alcohol or a polyhydric alcohol (or polyol) and an α,β-unsaturated carboxylic acid. While this description appears to imply that the unsaturated ester is prepared by contacting an alcohol or a polyol with an α,β-unsaturated carboxylic acid, one skilled in the art will recognize that the α,β-unsaturated ester can be prepared by a multitude of methods including reaction of an alcohol or a polyol with an α,β-unsaturated carboxylic acid, reaction of an alcohol or a polyol with an α,β-unsaturated carboxylic acid anhydride, transesterification of a simple α,β-unsaturated ester with an alcohol or a polyol, or reaction of an alcohol or a polyol with an α,β-unsaturated carboxylic acid halide, among other methods. Thus, the manner in which the α,β-unsaturated ester is described does not limit the method(s) by which the α,β-unsaturated ester can be produced. The alcohol or polyol component can comprise, consist essentially of, or consist of, any aliphatic, cycloaliphatic, or aromatic alcohol or polyol. The α,β-unsaturated portion of the α,β-unsaturated ester component can be derived from any α,β-unsaturated acid or acid derivative having the structure A1 wherein the undesignated valency can be hydrogen, —OR' group, or a halide atom, where R' is selected from H or a $C_1$ to $C_{20}$ organyl group.

In an embodiment, the alcohol of the α,β-unsaturated ester composition described as an ester of an alcohol and an α,β-unsaturated carboxylic acid can comprise one alcohol group. In an embodiment, the alcohol of the α,β-unsaturated ester composition described as an ester of an alcohol and an α,β-unsaturated acid can comprise, consist essentially of, or consist of, methanol, ethanol, propanol, butanol, pentanol, hexanol, cyclohexanol, heptanol, octanol, 1-octanol, 2-octanol, 3-octanol, isooctanol, benzyl alcohol, phenol, a fatty alcohol, and the like, or combinations thereof. Nonlimiting examples of fatty alcohols suitable for use in the present disclosure include without limitation capryl alcohol (i.e., 1-octanol), 2-ethylhexanol (i.e., 2-octanol), pelargonic alcohol (i.e., 1-nonanol), capric alcohol (i.e., 1-decanol), undecyl alcohol (i.e., 1-undecanol), lauryl alcohol (i.e., 1-dodecanol), tridecyl alcohol (i.e., 1-tridecanol), myristyl alcohol (i.e., 1-tetradecanol), pentadecyl alcohol (i.e., 1-pentadecanol), cetyl alcohol (i.e., 1-hexadecanol), palmitoleyl alcohol (i.e., cis-9-hexadecen-1-ol), heptadecyl alcohol (i.e., 1-n-heptadecanol, heptadecanol), stearyl alcohol (i.e., 1-octadecanol), isostearyl alcohol (i.e., 16-methylheptadecan-1-ol), elaidyl alcohol (i.e., 9E-octadecen-1-ol), oleyl alcohol (i.e., cis-9-octadecen-1-ol), linoleyl alcohol (i.e., 9Z, 12Z-octadecadien-1-ol), elaidolinoleyl alcohol (i.e., 9E, 12E-octadecadien-1-ol), linolenyl alcohol (i.e., 9Z, 12Z, 15Z-octadecatrien-1-ol), elaidolinolenyl alcohol (i.e., 9E, 12E, 15-E-octadecatrien-1-ol), ricinoleyl alcohol (i.e., 12-hydroxy-9-octadecen-1-ol), nonadecyl alcohol (i.e., 1-nonadecanol), arachidyl alcohol (i.e., 1-eicosanol), heneicosyl alcohol (i.e., 1-heneicosanol), behenyl alcohol (i.e., 1-docosanol), erucyl alcohol (i.e., cis-13-docosen-1-ol), lignoceryl alcohol (i.e., 1-tetracosanol), ceryl alcohol (i.e., 1-hexacosanol), 1-heptacosanol, montanyl alcohol or cluytyl alcohol (i.e., 1-octacosanol), 1-nonacosanol, myricyl alcohol or melissyl alcohol (i.e., 1-triacontanol), 1-dotriacontanol, geddyl alcohol (i.e., 1-tetratriacontanol), cetearyl alcohol (i.e., a mixture of cetyl alcohol and stearyl alcohol), and the like, or combinations thereof.

In an alternative embodiment, the polyol of the α,β-unsaturated ester composition described as an ester of a polyol and an α,β-unsaturated carboxylic acid can comprise at least 2 alcohol groups; alternatively, at least 3 alcohol groups; or alternatively, at least 4 alcohol groups. In some embodiments, the polyol can comprise, consist essentially of, or consist of, a mixture of alcohols having an average of at least 1.5 alcohol groups per alcohol molecule; alternatively, an average of at least 2 alcohol groups per alcohol molecule; alternatively, an average of at least 2.5 alcohol groups per alcohol molecule; alternatively, an average of at least 3 alcohol groups per alcohol molecule; alternatively, an average of from 1.5 to 12 alcohol groups per alcohol molecule; alternatively, an average of from 1.5 to 9 alcohol groups per alcohol molecule; alternatively, an average of from 2 to 7 alcohol groups per alcohol molecule; alternatively, an average of from 2 to 5 alcohol groups per alcohol molecule; or alternatively, an average of from 2 to 4 alcohol groups per alcohol molecule.

In an embodiment, the polyol of the α,β-unsaturated ester composition described as an ester of a polyol and an α,β-unsaturated acid can comprise, consist essentially of, or consist of, ethylene glycol, diethylene glycol, triethylene glycol, tetraethylene glycol, tripropylene glycol, polyethylene glycols with a molecular weight of from 106 to 1000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or any combination thereof. In some embodiments, the polyol can comprise, consist essentially of, or consist of, an ethoxylate, propoxylate, or a mixed ethoxylate/propoxylate of a polyol or mixture of a polyols. In other embodiments, the polyol comprises a polyol ethoxylate product containing from 2 to 400 mol of ethylene oxide per mole of polyol.

In an embodiment, the α,β-unsaturated carboxylic acid of the α,β-unsaturated ester composition described as an ester of a polyol and an α,β-unsaturated carboxylic acid can comprise, consist essentially of, or consist of, acrylic acid, methacrylic acid, crotonic acid, isocrotonic acid, itaconic acid, 2-pentenoic acid, tiglic acid, angelic acid, citraconic acid, mesaconic acid, maleic acid, fumaric acid, or any combination thereof. In some embodiments, the α,β-unsaturated acid can comprise, consist essentially of, or consist of, acrylic acid, methacrylic acid, crotonic acid, isocrotonic acid, itaconic acid, maleic acid, or any combination thereof; alternatively, acrylic acid, methacrylic acid, or any combination thereof; alternatively, acrylic acid; alternatively; methacrylic acid; or alternatively, maleic acid. Those skilled in the art will recognize that when the α,β-unsaturated ester composition described as an ester of an alcohol or a polyol and an α,β-unsaturated carboxylic acid is not prepared by contacting an α,β-unsaturated acid and an alcohol or a polyol, the appropriate α,β-unsaturated carboxylic acid derivative of the disclosed carboxylic acids can be utilized in the preparation of the α,β-unsaturated ester; e.g., a carboxylic acid anhydride, a simple carboxylic acid ester, or a carboxylic acid halide.

Two general classes of α,β-unsaturated esters that can be used within the α,β-unsaturated ester composition are acrylate compounds and methacrylate compounds. Thus, in embodiments, the α,β-unsaturated ester composition can comprise, consist essentially of, or consist of, an acrylate composition, a methacrylate composition, or a composition comprising acrylates and methacrylates. In some embodiments, the α,β-unsaturated ester composition can comprise, consist essentially of, or consist of, an acrylate composition; alternatively, a methacrylate composition; or alternatively, a composition comprising, consisting essentially of, or consisting of, a mixture of acrylates and methacrylates. Generally, the acrylate/methacrylate composition utilized to form a poly ((β-thioether ester) of the present invention can have the same quantity of acrylate and/or methacrylate groups per acrylate/methacrylate molecule as α,β-unsaturated ester groups per α,β-unsaturated ester molecule described herein. In some embodiments, the acrylate composition can comprise, consist essentially of, or consist of, an acrylate, a diacrylate, a triacrylate, a tetraacrylate, or mixtures thereof. In other embodiments, the methacrylate composition can comprise, consist essentially of, or consist of, a methacrylate, a dimethacrylate, a trimethacrylate, a tetramethacrylate, or mixtures thereof. In yet other embodiments, the composition comprising a mixture of acrylates and methacrylates can comprise a combination of at least one acrylate, diacrylate, triacrylate, or tetraacrylate and at least one methacrylate, dimethacrylate, trimethacrylate, or tetramethacrylate.

In an embodiment, acrylates that can be utilized within the acrylate composition can comprise, consist essentially of, or consist of, 2-ethylhexyl acrylate, nonyl acrylate, decyl acrylate, undecyl acrylate, lauryl acrylate, tridecyl acrylate, myristyl acrylate, pentadecyl acrylate, cetyl acrylate, palmitoleyl acrylate, oleyl acrylate, heptadecyl acrylate, stearyl acrylate, isostearyl acrylate, elaidyl acrylate, oleyl acrylate, linoleyl acrylate, elaidolinoleyl acrylate, linolenyl acrylate, elaidolinolenyl acrylate, ricinoleyl acrylate, nonadecyl acrylate, arachidyl acrylate, heneicosyl acrylate, behenyl acrylate, erucyl acrylate, lignoceryl acrylate, ceryl acrylate, 1-heptacosanyl acrylate, montanyl acrylate, 1-nonacosanyl acrylate, myricyl acrylate, 1-dotriacontanyl acrylate, geddyl acrylate, cetearyl acrylate, and the like, or any combination thereof. Alternatively, in an embodiment, acrylates that can be utilized within the acrylate composition can comprise, consist essentially of, or consist of, ethylene glycol diacrylate, diethylene glycol diacrylate, triethylene glycol diacrylate, tetraethylene glycol diacrylate, tripropylene glycol diacrylate, 1,2-propanediol diacrylate, 1,3-propanediol diacrylate, 1,2-butanediol diacrylate, 1,3-butanediol diacrylate, 1,4-butanediol diacrylate, 1,5-pentanediol diacrylate, neopentyl glycol diacrylate, 1,2-hexanediol diacrylate, 1,6-hexanediol diacrylate, 1,2-cyclohexanediol diacrylate, 1,4-cyclohexanediol diacrylate, 1,2-octanediol diacrylate, 1,8-octanediol diacrylate, 1,2-decanediol diacrylate, 1,10-decanediol diacrylate, 2-hydroxypropyl-1,3-diacrylate, glycerol diacrylate, glycerol 1,3-diacrylate, glycerol triacrylate, 2,2-dimethylolpropane diacrylate, trimethylolethane triacrylate, trimethylolpropane triacrylate, pentaerythritol diacrylate, pentaerythritol triacrylate, pentaerythritol tetraacrylate, dipentaerythritol diacrylate, dipentaerythritol hexaacrylate, sorbitol diacrylate, sorbitol triacrylate, sorbitol tetraacrylate, sorbitol pentaacrylate, sorbitol hexaacrylate, 1,2,4-butanediol triacrylate, 2,2,4-trimethyl-1,3-pentanediol diacrylate, 1-phenylethylene-1,2-diacrylate, 1,4-benzenediol diacrylate, or any combination thereof. In some embodiments, acrylates that can be utilized within the acrylate composition can comprise, consist essentially of, or consist of, bisphenol A diacrylate (2,2-di(4-hydroxyphenyl)propane diacrylate), bisphenol F diacrylate (bis(4-hydroxyphenyl)methane diacrylate), bisphenol S diacrylate (4,4'-dihydroxydiphenylsulfone diacrylate), bisphenol Z diacrylate (4,4'-cyclohexylidenebisphenol diacrylate), bis(2-hydroxyphenyl)methane diacrylate, bisphenol A ethoxylate diacrylate, bisphenol A propoxylate diacrylate, bisphenol A glycerolate diacrylate, bisphenol A propoxylate/ethoxylate diacrylate, bisphenol A ethoxylate glycerolate diacrylate, bisphenol A propoxylate glycerolate diacrylate, bisphenol F ethoxylate diacrylate, bisphenol F propoxylate diacrylate, bisphenol F glycerolate diacrylate, bisphenol F propoxylate/ethoxylate diacrylate, bisphenol F ethoxylate glycerolate diacrylate, bisphenol F propoxylate glycerolate diacrylate, bisphenol S ethoxylate diacrylate, bisphenol S propoxylate diacrylate, bisphenol S glycerolate diacrylate, bisphenol S propoxylate/ethoxylate diacrylate, bisphenol S ethoxylate glycerolate diacrylate, bisphenol S propoxylate glycerolate diacrylate, bisphenol Z ethoxylate diacrylate, bisphenol Z propoxylate diacrylate, bisphenol Z glycerolate diacrylate, bisphenol Z propoxylate/ethoxylate diacrylate, bisphenol Z ethoxylate glycerolate diacrylate, bisphenol Z propoxylate glycerolate diacrylate, bis(2-hydroxyphenyl)methane ethoxylate diacrylate, bis(2-hydroxyphenyl)methane propoxylate diacrylate, bis(2-hydroxyphenyl)methane glycerolate diacrylate, bis(2-hydroxyphenyl)methane propoxylate/ethoxylate diacrylate, bis(2-hydroxyphenyl)methane ethoxylate glycerolate diacrylate, bis(2-hydroxyphenyl)methane propoxylate glycerolate diacrylate, or any combination thereof.

In an embodiment, the methacrylates that can be utilized within the methacrylate composition can comprise, consist essentially of, or consist of, 2-ethylhexyl methacrylate, nonyl methacrylate, decyl methacrylate, undecyl methacrylate, lauryl methacrylate, tridecyl methacrylate, myristyl methacrylate, pentadecyl methacrylate, cetyl methacrylate, palmitoleyl methacrylate, oleyl methacrylate, heptadecyl methacrylate, stearyl methacrylate, isostearyl methacrylate, elaidyl methacrylate, oleyl methacrylate, linoleyl methacrylate, elaidolinoleyl methacrylate, linolenyl methacrylate, elaidolinolenyl methacrylate, ricinoleyl methacrylate, nonadecyl methacrylate, arachidyl methacrylate, heneicosyl methacrylate, behenyl methacrylate, erucyl methacrylate, lignoceryl methacrylate, ceryl methacrylate, 1-heptacosanyl methacrylate, montanyl methacrylate, 1-nonacosanyl methacrylate, myricyl methacrylate, 1-dotriacontanyl methacrylate, geddyl methacrylate, cetearyl methacrylate, and the like, or any combination thereof. In an embodiment, the methacrylates that can be utilized within the methacrylate composition can comprise, consist essentially of, or consist of, ethylene glycol dimethacrylate, diethylene glycol dimethacrylate, triethylene glycol dimethacrylate, tetraethylene glycol dimethacrylate, tripropylene glycol dimethacrylate, 1,2-propanediol dimethacrylate, 1,3-propanediol dimethacrylate, 1,2-butanediol dimethacrylate, 1,3-butanediol dimethacrylate, 1,4-butanediol dimethacrylate, 1,5-pentanediol dimethacrylate, neopentyl glycol dimethacrylate, 1,2-hexanediol dimethacrylate, 1,6-hexanediol dimethacrylate, 1,2-cyclohexanediol dimethacrylate, 1,4-cyclohexanediol dimethacrylate, 1,2-octanediol dimethacrylate, 1,8-octanediol dimethacrylate, 1,2-decanediol dimethacrylate, 1,10-decanediol dimethacrylate, 2-hydroxypropyl-1,3-dimethacrylate, glycerol dimethacrylate, glycerol 1,3-dimethacrylate, glycerol trimethacrylate, 2,2-dimethylolpropane dimethacrylate, trimethylolethane trimethacrylate, trimethylolpropane trimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol dimethacrylate, sorbitol trimethacrylate, sorbitol tetramethacrylate, sorbitol pentamethacrylate, sorbitol hexamethacrylate, 1,2,4-butanediol trimethacrylate, 2,2,4-trimethyl-1,3-pentanediol dimethacrylate, 1-phenylethylene-1,2-dimethacrylate, 1,4-benzenediol dimethacrylate, or any combination thereof. In some embodiments, the methacrylates that can be utilized within the methacrylate composition can comprise, consist essentially of, or consist of, bisphenol A dimethacrylate (2,2-di(4-hydroxyphenyl)propane dimethacrylate), bisphenol F dimethacrylate (bis(4-hydroxyphenyl)methane dimethacrylate), bisphenol Z dimethacrylate (4,4'-cyclohexylidenebisphenol dimethacrylate), bis(2-hydroxyphenyl)methane dimethacrylate, bisphenol A ethoxylate dimethacrylate, bisphenol A propoxylate dimethacrylate, bisphenol A glycerolate dimethacrylate, bisphenol A propoxylate/ethoxylate dimethacrylate, bisphenol A ethoxylate glycerolate dimethacrylate, bisphenol A propoxylate glycerolate dimethacrylate, bisphenol F ethoxylate dimethacrylate, bisphenol F propoxylate dimethacrylate, bisphenol F glycerolate dimethacrylate, bisphenol F propoxylate/ethoxylate dimethacrylate, bisphenol F ethoxylate glycerolate dimethacrylate, bisphenol F propoxylate glycerolate dimethacrylate, bisphenol Z ethoxylate dimethacrylate, bisphenol Z propoxylate dimethacrylate, bisphenol Z glycerolate dimethacrylate, bisphenol Z propoxylate/ethoxylate dimethacrylate, bisphenol Z ethoxylate glycerolate dimethacrylate, bisphenol Z propoxylate glycerolate dimethacrylate, bis(2-hydroxyphenyl)methane ethoxylate dimethacrylate, bis(2-hydroxyphenyl)methane propoxylate dimethacrylate, bis(2-hydroxyphenyl)methane glycerolate dimethacrylate, bis(2-hydroxyphenyl)methane propoxylate/ethoxylate dimethacrylate, bis(2-hydroxyphenyl)methane ethoxylate glycerolate dimethacrylate, bis(2-hydroxyphenyl)methane propoxylate glycerolate dimethacrylate, or any combination thereof.

In an embodiment, the α,β-unsaturated amide can be a $C_4$ to $C_{30}$ α,β-unsaturated amide, alternatively, a $C_6$ to $C_{20}$ α,β-unsaturated amide, alternatively, or alternatively, a $C_{10}$ to $C_{15}$ α,β-unsaturated amide. When the α,β-unsaturated amide has only one amide group attached to the carbon-carbon double bond, the compound can be an acrylamide. In some embodiments, the α,β-unsaturated amide can comprise a group having Structure A2:

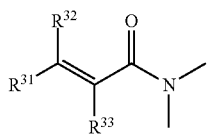

A2 where the undesignated valencies represent the remainder of the Structure A2. In an aspect, $R^{31}$, $R^{32}$, and $R^{33}$ of the group A2 can be H, an organyl group, or a hydrocarbyl group; alternatively, H or an organyl group; or alternatively, H or a hydrocarbyl group. Organyl and hydrocarbyl group have been previously described herein and can be utilized, without limitation, to further describe $R^{31}$, $R^{32}$, and $R^{33}$ of the α,β-unsaturated amide comprising Structure A2 which can be present in the α,β-unsaturated amide compounds which can be utilized as thiophenol removing agents. In some particular non-limiting embodiments, $R^{31}$, $R^{32}$, and $R^{33}$ are H (an acrylamide), or $R^{31}$ and $R^{32}$ are H and $R^{33}$ is a methyl group (a methacrylamide), or a combination thereof; alternatively, $R^{31}$, $R^{32}$, and $R^{33}$ are H (an acrylamide); or alternatively, $R^{31}$ and $R^{32}$ are H and $R^{33}$ is a methyl group (a methacrylamide). When an α,β-unsaturated amide molecule comprises two or more A2 groups, the additional A2 groups can be located within $R^1$, $R^2$, $R^3$ and/or one of the undesignated nitrogen valencies. In some particular embodiments, when the α,β-unsaturated amide comprises two or more A2 groups, the additional A2 groups can be located within the undesignated nitrogen valencies. Any of the substituent groups used to describe the $R^{21}$, $R^{22}$, and $R^{23}$ substituent groups can also be used to describe the $R^{31}$, $R^{32}$, and $R^{33}$ substituent groups, respectively.

In an embodiment, the α,β-unsaturated amide composition can comprise, consist essentially of, or consist of, an α,β-unsaturated amide having at least 2 α,β-unsaturated amide groups having structure A2. In some embodiments, the α,β-unsaturated amide composition can comprise, consist essentially of, or consist of, an α,β-unsaturated amide having at least 3 α,β-unsaturated amide groups having structure A2. In other embodiments, the α,β-unsaturated amide composition can comprise, consist essentially of, or consist of, a mixture of α,β-unsaturated amide molecules having structure A2. When the α,β-unsaturated amide composition comprises, consists essentially of, or consists of, a mixture of α,β-unsaturated amide molecules, the α,β-unsaturated amide molecules can have an average of at least 1.5 α,β-unsaturated amide groups having structure A2 per α,β-unsaturated amide molecule; alternatively, an average of at least 2 α,β-unsaturated amide groups having structure A2 per α,β-unsaturated amide molecule; alternatively, an average of at least 2.5 α,β-unsaturated amide groups having structure A2 per α,β-unsaturated amide molecule; or alternatively, an average of at least 3 α,β-unsaturated amide groups having structure A2 per α,β-unsaturated amide molecule. In yet other embodiments, the α,β-unsaturated amide molecules can have an average of from 1.5 to 12 α,β-unsaturated amide groups having structure A2 per α,β-unsaturated amide molecule; alternatively, an average of from 1.5 to 9 α,β-unsaturated amide groups having structure A2 per α,β-unsaturated amide molecule; alternatively, an average of from 2 to 7 α,β-unsaturated amide groups having structure A2 per α,β-unsaturated amide molecule; alternatively, an average of from 2 to 5 α,β-unsaturated amide groups having structure A2 per α,β-unsaturated amide molecule; or alternatively, an average of from 2 to 4 α,β-unsaturated amide groups having structure A2 per α,β-unsaturated amide molecule.

The α,β-unsaturated amide(s) comprising the α,β-unsaturated amide composition can be described as an amide of an amine or a polyamine and an α,β-unsaturated carboxylic acid. While this description appears to imply that the unsaturated amide is prepared by contacting an amine or a polyamine with an α,β-unsaturated carboxylic acid, one skilled in the art will recognize that the α,β-unsaturated amide can be prepared by a multitude of methods including reaction of a polyamine with an α,β-unsaturated carboxylic acid, reaction of a polyamine with an α,β-unsaturated carboxylic acid anhydride, reaction of a simple α,β-unsaturated carboxylic acid ester with a polyamine, or reaction of a polyamine with a α,β-unsaturated carboxylic acid halide among other methods. Thus, the manner in which the α,β-unsaturated amide is described does not limit the method(s) by which the α,β-unsaturated amide can be produced. The amine or polyamine component can comprise, consist essentially of, or consist of, any aliphatic, cycloaliphatic, or aromatic amine or polyamine. The α,β-unsaturated portion of the α,β-unsaturated amide component can be derived from any α,β-unsaturated carboxylic acid or acid derivative having the structure A2 wherein the undesignated valency can be hydrogen, —OR' group, or a halide atom, where R' is selected from H or a $C_1$ to $C_{20}$ organyl group.

In an embodiment, the polyamine of the α,β-unsaturated amide described as an amide of a polyamine and an α,β-unsaturated acid can be derived from a polyamine can comprise at least 2 primary or secondary amine groups; alternatively, at least 3 primary or secondary amine groups; or alternatively, at least 4 primary or secondary amine groups. In embodiments, the polyamine can comprise, consist essentially of, or consist of, a mixture of amines having an average of at least 1.5 primary or secondary amine groups per amine molecule; alternatively, an average of at least 2 primary or secondary amine groups per amine molecule; alternatively, an average of at least 2.5 primary or secondary amine groups per amine molecule; alternatively, an average of at least 3 primary or secondary amine groups per amine molecule; alternatively, an average of from 1.5 to 12 primary or secondary amine groups per amine molecule; alternatively, an average of from 1.5 to 9 primary or secondary amine groups per amine molecule; alternatively, an average of from 2 to 7 primary or secondary amine groups per amine molecule; alternatively, an average of from 2 to 5 primary or secondary amine groups per amine molecule; or alternatively, an average of from 2 to 4 primary or secondary amine groups per amine molecule.

In an embodiment, the polyamine of the α,β-unsaturated amide described as an amide of a polyamine and an α,β-unsaturated carboxylic acid can comprise, consist essentially of, or consist of, methylenediamine, ethylenediamine, diethylenetriamine (N-(2-aminoethyl)-1,2-ethanediamine), triethylenetetramine (1,2-ethanediamine,N,N'-bis(2-aminoethyl), N-(2-aminoethyl)-1,3-propanediamine, N,N'-1,2-ethanediylbis-1,3-propanediamine, tetraethylene pentamine, pentaethylene hexamine, 1,2-propanediamine, 1,3-propanediamine, dipropylene triamine, tributylene tetramine, trimethylhexamethylene diamine, hexamethylene triamine, tetramethylpropylenediamine, tetrabutylenepentamine, 1,2-butanediamine, 1,3-butanediamine, 1,4-butylenediamine, 1,5-pentanediamine, 1,6-hexanediamine, 1,7-heptanediamine, octanediamine, decanediamine, dodecanediamine, 1,2-diaminocyclohexane 1,4-diaminocyclohexane, 1,3-bisaminocyclohexylamine, 4,4'-methylenebiscyclohexanamine, isophoronediamine, o-xylylenediamine, m-xylylenediamine, p-xylylenediamine, methylene diamine dianilene, diaminodiphenylmethane, bisphenylenediamine, diaminodiphenylsulfone, N-aminoethyl piperazine, or any combination thereof. In some embodiments, the polyamine can comprise polyalkylenepolyamines, polyethyleneamines, or mixtures thereof. In other embodiments, the polyamine can comprise, consist essentially of, or consist of, polyalkylenepolyamines; or alternatively, polyethyleneamines.

In an embodiment, the α,β-unsaturated acid of the α,β-unsaturated amide composition described as an amide of a polyamine and an α,β-unsaturated carboxylic acid can comprise, consist essentially of, or consist of, acrylic acid, methacrylic acid, crotonic acid, isocrotonic acid, itaconic acid, 2-pentenoic acid, tiglic acid, angelic acid, citraconic acid, mesaconic acid, maleic acid, fumaric acid, or mixtures thereof. In some embodiments, the α,β-unsaturated carboxylic acid can comprise, consist essentially of, or consist of, acrylic acid, methacrylic acid, crotonic acid, isocrotonic acid, itaconic acid, maleic acid, or any combination thereof; alternatively, acrylic acid, methacrylic acid, or any combination thereof; alternatively, acrylic acid; alternatively; methacrylic acid; or alternatively, maleic acid. Those skilled in the art will recognize that when the α,β-unsaturated amide composition described as an ester of a polyamine and an α,β-unsaturated carboxylic acid is not prepared by contacting an α,β-unsaturated acid and a polyamine, the appropriate α,β-unsaturated carboxylic acid derivative of the disclosed carboxylic acids can be utilized in the preparation of the α,β-unsaturated ester, e.g., a carboxylic acid anhydride, a simple carboxylic acid ester, or a carboxylic acid halide.

Two general classes of α,β-unsaturated amides that can be used within the α,β-unsaturated amide composition are acrylamide compounds and methacrylamide compounds. Thus, in some embodiments, the α,β-unsaturated amide composition can be an acrylamide composition, a methacrylamide composition, or a composition comprising acrylamides and methacrylamides. In some embodiments, the α,β-unsaturated amide composition can comprise, consist essentially of, or consist of, an acrylamide composition; alternatively, a methacrylamide composition; or alternatively, composition comprising a mixture of acrylamides and methacrylamides. Generally, the acrylamide/methacrylamide composition utilized to form a poly((β-thioether ester) of the present disclosure can have the same quantity of acrylamide and/or methacrylamide groups per acrylamide/methacrylamide molecule as α,β-unsaturated amide groups per α,β-unsaturated amide molecule described herein. In some embodiments, the acrylamide composition can comprise, consist essentially of, or consist of, an acrylamide, a diacrylamide, a triacrylamide, a tetraacrylamide, or mixtures thereof. In other embodiments, the methacrylamide composition can comprise a methylcrylamide, a dimethacrylamide, a trimethacrylamide, a tetramethacrylamide, or mixtures thereof. In yet other embodiments, the composition comprising a mixture of acrylamides and methacrylamides can comprise, consist essentially of, or consist of, a combination of at least one acrylamide, diacrylamide, triacrylamide, or tetraacrylamide and at least one methylacrylamide, dimethacrylamide, trimethacrylamide, or tetramethacrylamide.

In an embodiment, acrylamides that can be utilized within the acrylamide composition can comprise, consist essentially of, or consist of, methane diacrylamide, ethylene diacrylamide, 1,6-hexane diacrylamide, propyl diacrylamide, 1,4-cyclohexane diacrylamide, bis(4-aminocyclohexyl)methane diacrylamide, diethylene triamine trisacrylamide, methane diacrylamide, ethane diacrylamide, triethylenetetramine diacrylamide, 1,2-propane diacrylamide, 1,3-propane diacrylamide, 1,2-butane diacrylamide, 1,3-butane diacrylamide, 1,4-butane diacrylamide, 1,5-pentane diacrylamide, 1,6-hexane diacrylamide, 1,7-heptane diacrylamide, octane diacrylamide, decane diacrylamide, dodecane diacrylamide, cyclohexane 1,2-diacrylamide, cyclohexane 1,4-diacrylamide, 1,3-bisacrylamidocyclohexane, isophorone diacrylamide, o-xylylene diacrylamide, m-xylylene diacrylamide, p-xylylene diacrylamide, methylene diacrylamide dianilene, diacrylamidodiphenylmethane, bisphenylenediacrylamide, diacrylomidodiphenylsulfone, N-acrylamidoethyl piperazine, or any combination thereof.

In an embodiment, the methacrylamides that can be utilized within the methacrylamide composition can comprise, consist essentially of, or consist of, methane dimethacrylamide, ethane dimethacrylamide, 1,6-hexane dimethacrylamide, propyl dimethacrylamide, 1,4-cyclohexane dimethacrylamide, bis(4-aminocyclohexyl)methane dimethacrylamide, diethylene triamine trismethacrylamide, methane dimethacrylamide, ethane dimethacrylamide, triethylenetetramine dimethacrylamide, 1,2-propane dimethacrylamide, 1,3-propane dimethacrylamide, 1,2-butane dimethacrylamide, 1,3-butane dimethacrylamide, 1,4-butane dimethacrylamide, 1,5-pentane dimethacrylamide, 1,6-hexane dimethacrylamide, 1,7-heptane dimethacrylamide, octane dimethacrylamide, decane dimethacrylamide, dodecane dimethacrylamide, cyclohexane 1,2-dimethacrylamide, cyclohexane 1,4-dimethacrylamide, 1,3-bismethacrylamidocyclohexane, isophorone dimethacrylamide, o-xylylene dimethacrylamide, m-xylylene dimethacrylamide, p-xylylene dimethacrylamide, methylene dimethacrylamide dianilene, dimeth-acryl-amido-diphenylmethane, bisphenylenedimethacrylamide, dimethacrylomidodiphenylsulfone, or N-meth-acryl-amido-ethyl piperazine.

In an embodiment, the α,β-unsaturated ketone can be a $C_4$ to $C_{30}$ α,β-unsaturated ketone, alternatively, a $C_6$ to $C_{20}$ α,β-unsaturated ketone, alternatively, or alternatively, a $C_{10}$ to $C_{15}$ α,β-unsaturated ketone. Without wishing to be limited by theory, an α,β-unsaturated ketone is also known as an enone. When the α,β-unsaturated ketone has only one ketone group attached to the carbon-carbon double bond, the compound can be a vinyl ketone. In some embodiments, the α,β-unsaturated ketone can comprise a group having Structure A3:

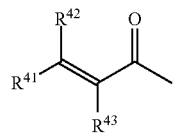

A3 where the undesignated valency represents the remainder of the Structure A3. In an aspect, $R^{41}$, $R^{42}$, and $R^{43}$ of the group A3 can be H, an organyl group, or a hydrocarbyl group; alternatively, H or an organyl group; or alternatively, H or a hydrocarbyl group. Organyl and hydrocarbyl group have been previously described herein and can be utilized, without limitation, to further describe, $R^{41}$, $R^{42}$, and $R^{43}$ of the α,β-unsaturated ketone comprising Structure A3 which can be present in the α,β-unsaturated ketone compounds which can be utilized as thiophenol removing agents. In some particular non-limiting embodiments, $R^{41}$, $R^{42}$, and $R^{43}$ are H (a vinyl ketone), or $R^{41}$ and $R^{42}$ are H and $R^{43}$ is a methyl group (an isopropenyl ketone), or a combination thereof; alternatively, $R^{41}$, $R^{42}$, and $R^{43}$ are H (a vinyl ketone); or alternatively, $R^{41}$ and $R^{42}$ are H and $R^{43}$ is a methyl group (an isopropenyl ketone). When an α,β-unsaturated ketone molecule comprises two or more A3 groups, the additional A3 groups can be located within $R^1$, $R^2$, $R^3$ and/or the undesignated ketone valency. In some particular embodiments, when the α,β-unsaturated ketone comprises two or more A3 groups, the additional A3 groups can be located within the undesignated ketone valency. Any of the substituent groups used to describe the $R^{21}$, $R^{22}$, and $R^{23}$ substituent groups can also be used to describe the $R^{41}$, $R^{42}$, and $R^{43}$ substituent groups, respectively.

In an embodiment, the α,β-unsaturated ketone composition can comprise, consist essentially of, or consist of, an α,β-unsaturated ketone having at least 2 α,β-unsaturated ketone groups having structure A3. In some embodiments, the α,β-unsaturated ketone composition can comprise, consist essentially of, or consist of, an α,β-unsaturated ketone having at least 3 α,β-unsaturated ketone groups having structure A3. In other embodiments, the α,β-unsaturated ketone composition can comprise, consist essentially of, or consist of, a mixture of α,β-unsaturated ketone molecules having structure A3. When the α,β-unsaturated ketone composition comprises, consists essentially of, or consists of, a mixture of α,β-unsaturated ketone molecules, the α,β-unsaturated ketone molecules can have an average of at least 1.5 α,β-unsaturated ketone groups having structure A3 per α,β-unsaturated ketone molecule; alternatively, an average of at least 2 α,β-unsaturated ketone groups having structure A3 per α,β-unsaturated ketone molecule; alternatively, an average of at least 2.5 α,β-unsaturated ketone groups having structure A3 per α,β-unsaturated ketone molecule; or alternatively, an average of at least 3 α,β-unsaturated ketone groups having structure A3 per α,β-unsaturated ketone molecule. In yet other embodiments, the α,β-unsaturated ketone molecules can have an average of from 1.5 to 12 α,β-unsaturated ketone groups having structure A3 per α,β-unsaturated ketone molecule; alternatively, an average of from 1.5 to 9 α,β-unsaturated ketone groups having structure A3 per α,β-unsaturated ketone molecule; alternatively, an average of from 2 to 7 α,β-unsaturated ketone groups having structure A3 per α,β-unsaturated ketone molecule; alternatively, an average of from 2 to 5 α,β-unsaturated ketone groups having structure A3 per α,β-unsaturated ketone molecule; or alternatively, an average of from 2 to 4 α,β-unsaturated ketone groups having structure A3 per α,β-unsaturated ketone molecule.

The α,β-unsaturated ketone(s) comprising the α,β-unsaturated ketone composition can be described as a ketone derived from an α,β-unsaturated alcohol. While this description appears to imply that the unsaturated ketone is prepared by the oxidation of the unsaturated alcohol, one skilled in the art will recognize that the α,β-unsaturated ketone can be prepared by a multitude of methods including alkyne-carbonyl coupling reactions, allylic oxidation of olefins, oxidative rearrangement of tertiary allylic alcohols, aldol condensations, Knoevenagel condensations, Perkin reactions, Michael additions, among other methods. Thus, the manner in which the α,β-unsaturated ketone is described does not limit the method(s) by which the α,β-unsaturated ketone can be produced. The α,β-unsaturated alcohol component can comprise, consist essentially of, or consist of, any aliphatic, cycloaliphatic, or aromatic α,β-unsaturated alcohol. The α,β-unsaturated alcohol portion of the α,β-unsaturated ketone component can be derived from any α,β-unsaturated alcohol or alcohol derivative. Nonlimiting examples of α,β-unsaturated alcohol suitable for use in the present disclosure include allyl alcohol, cinnamyl alcohol (i.e., (2E)-3-phenylprop-2-en-1-ol), retinol (i.e., (2E, 4E, 6E, 8E)-3,7-dimethyl-9-(2,6, 6-trimethylcyclohex-1-enyl)nona-2,4,6,8-tetraen-1-ol), or any combinations thereof. In an alternative embodiment, an α,β-unsaturated ketone can be described as a ketone of an α,β-unsaturated aldehyde. In an embodiment, the α,β-unsaturated ketone can comprise, consist essentially of, or consist of, ketones of acrolein, ketones of methacrolein, mesityl oxide (i.e., 4-methylpent-3-en-2-one), isophorone (i.e., 3,5, 5-trimethyl-2-cyclohexene-1-one), chalcone (i.e., benzylideneacetophenone), or any combination thereof.

When the α,β-unsaturated ester has only two ester groups, or the α,β-unsaturated amide has only two amide groups, or the α,β-unsaturated ketone has only two ketone groups attached to the carbon-carbon double bond, the compound can have Structure U1, U2, U3, or U4; alternatively, U1; alternatively, U2; alternatively, U3; alternatively, U4.

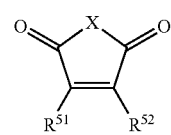

U1

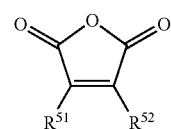

U2

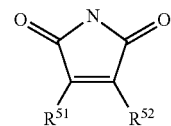

U3

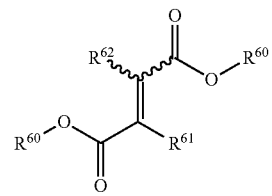

U4

In Structure U1, X, and $R^{51}$ and $R^{52}$ are independent elements of the α,β-unsaturated ester and the α,β-unsaturated ketone having Structure U1, and the α,β-unsaturated ester and the α,β-unsaturated ketone having Structure U1 can be described using any combination of X described herein and $R^{51}$ and $R^{52}$ described herein. In Structures U2 and U3, $R^{51}$ and $R^{52}$ are independent elements of the α,β-unsaturated ester and the α,β-unsaturated amide having Structure U2 or U3, respectively, and the α,β-unsaturated ester and the α,β-unsaturated amide having Structure U2 or U3, respectively, can be described using any combination $R^{51}$ and $R^{52}$ described herein. In Structure U4, $R^{60}$, $R^{61}$, and $R^{62}$ are independent elements of the α,β-unsaturated ester having Structure U4 and the α,β-unsaturated ester having Structure U4 can be described using any combination $R^{6o}$, $R^{61}$ and $R^{62}$ described herein.

In an aspect, $R^{6o}$ can be a hydrocarbyl group. Hydrocarbyl groups are described herein and these hydrocarbyl groups can be utilized without limitation to further describe the α,β-unsaturated ester having Structure U4. In an aspect, $R^{61}$ and $R^{62}$ can independently be H, an organyl group, or a hydrocarbyl; alternatively, H or an organyl group; alternatively, H or a hydrocarbyl; alternatively, H; alternatively, an organyl group; or alternatively, a hydrocarbyl group. Organyl group and hydrocarbyl groups are described herein and these organyl and hydrocarbyl groups can be utilized without limitation to further describe $R^{51}$, $R^{52}$, $R^{60}$, $R^{61}$ and $R^{62}$ of the compounds having Structure U1, U2, or U3 or U4. In an aspect, X can be O, N, or S; alternatively, O; alternatively, N; or alternatively, S. In some particular non-limiting embodiments, $R^{51}$ and $R^{52}$ are H. In some particular non-limiting embodiments, $R^{61}$ and $R^{62}$ are H. Any of the substituent groups used to describe the $R^{21}$, $R^{22}$, and $R^{23}$ substituent groups can also be used to describe individually the $R^{51}$, $R^{52}$, $R^{60}$, $R^{61}$ and $R^{62}$ substituent groups.

In some embodiments, the α,β-unsaturated ester moiety can be incorporated into the thiophenol removing agent. In such an instance, moiety U5, can replace any or all of the moieties having Structure U6 within any thiophenol removing agent disclosed herein. One having ordinary skill in the art will recognize that when moiety U6 is provided in a thiophenol removing agent showing repeating structures, it can appear as moiety U7. In an embodiment, R" of Structure U6 and/or U7 each R" is selected from a $C_1$ to $C_{60}$ organylene group.

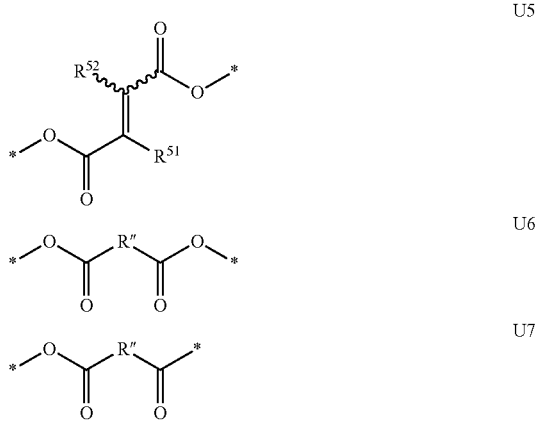

In an embodiment, the method of removing thiophenol from poly(arylene sulfide) compositions disclosed herein presents the advantage of removing thiophenol from the poly(arylene sulfide) compositions while the composition is still in the reactor. In such an embodiment, the thiophenol, which is a known toxic/hazardous chemical, can be removed without exposing the personnel to high levels of thiophenol, e.g., equal to or greater than about 1 wt. %, based on the weight of the polar organic compound.

In an embodiment, the method of removing thiophenol from poly(arylene sulfide) compositions disclosed herein presents the advantage of recycling and/or reusing the polar organic compound (e.g., NMP) after removing the thiophenol. In such an embodiment, in addition to being cost effective, recycling and/or reusing the polar organic compound (e.g., NMP) presents the further advantage of not having to dispose of a polar organic compound (e.g., NMP) with a high level of thiophenol, e.g., equal to or greater than about 1 wt. %, based on the weight of the polar organic compound.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

EXAMPLES

The following examples are set forth to provide a detailed description of how the methods claimed herein are evaluated, and are not intended to limit the scope of what the inventors regard as their invention.

Example 1

A "bad" batch of PPS containing thiophenol was produced by the following procedure. A 1 L stainless steel autoclave reactor was charged with 0.666 moles of NaSH, 0.683 moles of NaOH, 0.4 moles of sodium acetate (NaOAc), and 1.66 moles of NMP. The mixture comprising NaSH, NaOH, NaOAc, and NMP was degassed with nitrogen by pressurizing the reactor to 50 pounds per square inch (psi) and releasing the pressure five times, followed by pressurizing the reactor to 250 psi and releasing the pressure five times. The mixture was dehydrated under a flow of nitrogen (2 mL/min) and the reactor was heated to 205° C. The dichlorobenzene charge (0.599 moles) in 0.5 moles of NMP was added immediately after the dehydration. The charge vessel was rinsed with an additional 0.25 moles of NMP. The reactor was then heated to 240° C. and held for 3 hours, and then the temperature was raised to 265° C. and held for an additional 2 hours. The reactor was allowed to cool to room temperature overnight. The purity of the reagents is shown in Table 1.

TABLE 1

| Reagent | Purity [wt. %] |
|---------|----------------|
| NaSH    | 59.51          |
| NaOH    | 99.20          |
| NaOAc   | 99.30          |

The next day, after the reaction mixture reached room temperature, a sample of the liquid portion of the reaction mixture, which included NMP and thiophenol, was collected from the reactor. The sample was collected by opening the reactor (e.g., cracking the reactor open) and collecting the sample under ambient conditions. The sample was analyzed for thiophenol content immediately after it was collected. Thiophenol analysis was performed using an Agilent® 7890 capillary gas chromatograph (GC) equipped with a flame ionization detector (FID). The analysis was performed using a DB-5 column (30 m×0.32 mm) with a 1.0 µm film thickness. The inlet temperature was set at 325° C. and held at 6 psi with a 15:1 split ratio. The FID detector temperature was held at 325° C. with the following gas flow settings: 30 mL/min $H_2$, 380 mL/min air, and 25 mL/min He. After the sample was injected, the oven temperature was ramped from 60° C. to 320° C. at a 0.5° C./min ramp rate. Calibration of the GC for weight percent (wt. %) thiophenol, based on the total NMP mass of the reactor contents, was accomplished using dilute thiophenol standards in NMP. All reported thiophenol values are in wt. % versus NMP. The thiophenol comprised 23.36 wt. % of the liquid sample analyzed.

The liquid portion of the reaction mixture that contained 23.36 wt. % thiophenol was further subjected to a thiophenol removal procedure. An amount of 75 g of 2-ethylhexyl acrylate was added to the thiophenol-containing reaction mixture. The reactor was resealed and stirred at room temperature for 6 hours. During the first 3 minutes of stifling an exothermic reaction took place, raising the temperature from 23° C. to 40° C. very quickly. After approximately 40 minutes the reactor returned to room temperature. Analysis of the material after 14 hours measured a thiophenol content of 2.0 wt. % thiophenol. Another 10 g of 2-ethylhexyl acrylate was added to the reaction mixture, and the mixture was stirred for 6 hours at room temperature. No exothermic reaction was noted after the second addition of 2-ethylhexyl acrylate. The second addition of acrylate further reduced the thiophenol content to a total of 0.31 wt. %. Results show that the thiophenol content was reduced by 91.4% after the first addition of 2-ethylhexyl acrylate; and after the second addition of 2-ethylhexyl acrylate, the total thiophenol removal was 98.6%.

ADDITIONAL DISCLOSURE

The following are nonlimiting specific embodiments in accordance with the present disclosure:

A first embodiment, which is a process comprising:
contacting a reaction product composition comprising a poly(arylene sulfide) composition and a polar organic compound, wherein the polar organic compound comprises greater than or equal to about 1 wt. % thiophenol, with a $C_4$-$C_{30}$ α,β-unsaturated ketone, a $C_4$-$C_{30}$ α,β-unsaturated ester, a $C_4$-$C_{30}$ α,β-unsaturated amide, or any combination thereof, wherein after the contacting, the polar organic compound comprises less than about 1 wt. % thiophenol.

A second embodiment, which is the process of the first embodiment, wherein the reaction product composition is produced by contacting:
i) at least one halogenated aromatic compound having two halogens,
ii) a sulfur compound, and
iii) the polar organic compound.

A third embodiment, which is the process of any of the first to the second embodiments, wherein the poly(arylene sulfide) composition is a poly(phenylene sulfide) composition.

A fourth embodiment, which is the process of any of the second to the third embodiments, wherein the halogenated aromatic compound comprises p-dichlorobenzene and the sulfur compound comprises sodium sulfide, sodium hydrosulfide, or any combination thereof.

A fifth embodiment, which is the process of any of the second to the fourth embodiments, wherein the polar organic compound comprises N-methyl-2-pyrrolidone.

A sixth embodiment, which is the process of any of the first to the fifth embodiments, wherein the poly(arylene sulfide) composition is contacted with the $C_4$-$C_{30}$ α,β-unsaturated ester.

A seventh embodiment, which is the process of the sixth embodiment, wherein the $C_4$-$C_{30}$ α,β-unsaturated ester comprises 2-ethylhexyl acrylate.

An eighth embodiment, which is the process of the sixth embodiment, wherein the $C_4$-$C_{30}$ α,β-unsaturated ester comprises an ester of acrylic acid with a fatty alcohol.

A ninth embodiment, which is the process of the sixth embodiment, wherein the $C_4$-$C_{30}$ α,β-unsaturated ester comprises an ester of methacrylic acid with a fatty alcohol.

A tenth embodiment, which is the process of any of the first to the ninth embodiments, wherein the reaction product composition is contacted with at least one stoichiometric equivalent of the $C_4$-$C_{30}$ α,β-unsaturated ketone, the $C_4$-$C_{30}$ α,β-unsaturated ester, the $C_4$-$C_{30}$ α,β-unsaturated amide, or any combination thereof, per equivalent of thiophenol.

An eleventh embodiment, which is the process of any of the first to the tenth embodiments, wherein the contacting occurs at a temperature less than or equal to about 200° C.

A twelfth embodiment, which is the process of any of the first to the eleventh embodiments, wherein the polar organic compound comprising less than 1 wt. % thiophenol is separated from the reaction product composition.

A thirteenth embodiment, which is the process of the twelfth embodiment, wherein the separated polar organic compound is used in a process for producing a poly(arylene sulfide) composition.

A fourteenth embodiment which is a process comprising contacting a composition comprising a polar organic compound and greater than or equal to about 1 wt. % thiophenol with a $C_4$-$C_{30}$ α,β-unsaturated ketone, a $C_4$-$C_{30}$ α,β-unsaturated ester, a $C_4$-$C_{30}$ α,β-unsaturated amide, or any combination thereof, to form a composition comprising the polar organic compound and less than about 1 wt. % thiophenol.

A fifteenth embodiment, which is the process of the fourteenth embodiment, wherein the polar organic compound comprises N-methyl-2-pyrrolidone.

A sixteenth embodiment, which is the process of any of the fourteenth to the fifteenth embodiments, wherein the composition comprising the polar organic compound and greater than or equal to about 1 wt. % thiophenol is formed during a process of producing a poly(arylene sulfide) composition comprising contacting:
i) at least one halogenated aromatic compound having two halogens,
ii) a sulfur compound, and
iii) the polar organic compound.

A seventeenth embodiment, which is the process of the sixteenth embodiment, wherein the polar organic compound comprises N-methyl-2-pyrrolidone.

An eighteenth embodiment, which is the process of the seventeenth embodiment, wherein the composition comprising N-methyl-2-pyrrolidone and greater than or equal to about 1 wt. % thiophenol is separated from the poly(arylene sulfide) composition prior to the contacting.

A nineteenth embodiment, which is the process of any of the fourteenth to the eighteenth embodiments, wherein the composition comprising polar organic compound and greater than or equal to about 1 wt. % thiophenol is contacted with the $C_4$-$C_{30}$ α,β-unsaturated ester.

A twentieth embodiment, which is the process of the nineteenth embodiment, wherein the $C_4$-$C_{30}$ α,β-unsaturated ester comprises 2-ethylhexyl acrylate.

A twenty-first embodiment, which is the process of the nineteenth embodiment, wherein the $C_4$-$C_{30}$ α,β-unsaturated ester comprises an ester of acrylic acid with a fatty alcohol.

A twenty-second embodiment, which is the process of the nineteenth embodiment, wherein the $C_4$-$C_{30}$ α,β-unsaturated ester comprises an ester of methacrylic acid with a fatty alcohol.

A twenty-third embodiment, which is the process of the eighteenth embodiment, wherein the composition comprising N-methyl-2-pyrrolidone and less than 1 wt. % thiophenol is recycled to a process for producing the poly(arylene sulfide) composition.

A twenty-fourth embodiment, which is the process of any of the fourteenth to the twenty-third embodiments, wherein the composition comprising a polar organic compound and greater than or equal to about 1 wt. % thiophenol is contacted with at least one stoichiometric equivalent of the $C_4$-$C_{30}$ α,β-unsaturated ketone, the $C_4$-$C_{30}$ α,β-unsaturated ester, the $C_4$-$C_{30}$ α,β-unsaturated amide, or any combination thereof, per equivalent of thiophenol.

A twenty-fifth embodiment, which is the process of any of the fourteenth to the twenty-fourth embodiments, wherein the contacting occurs at a temperature less than or equal to about 200° C.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A process comprising:
    contacting a reaction product composition comprising a poly(arylene sulfide) composition and a polar organic compound, wherein the polar organic compound comprises greater than or equal to about 1 wt. % thiophenol, with a compound consisting of at least one $C_4$-$C_{30}$ α,β-unsaturated ketone, at least one $C_4$-$C_{30}$ α,β-unsaturated ester, at least one $C_4$-$C_{30}$ α,β-unsaturated amide, or any combination thereof, wherein after the contacting, the polar organic compound comprises less than about 1 wt. % thiophenol.

2. The process of claim 1, wherein the reaction product composition is produced by contacting:
    i) at least one halogenated aromatic compound having two halogens,
    ii) a sulfur compound, and
    iii) the polar organic compound.

3. The process of claim 1, wherein the poly(arylene sulfide) composition is a poly(phenylene sulfide) composition.

4. The process of claim 2, wherein the halogenated aromatic compound comprises p-dichlorobenzene and the sulfur compound comprises sodium sulfide, sodium hydrosulfide, or any combination thereof.

5. The process of claim 2, wherein the polar organic compound comprises N-methyl-2-pyrrolidone.

6. The process of claim 1, wherein the poly(arylene sulfide) composition is contacted with the $C_4$-$C_{30}$ α,β-unsaturated ester.

7. The process of claim 6, wherein the $C_4$-$C_{30}$ α,β-unsaturated ester comprises 2-ethylhexyl acrylate.

8. The process of claim 6, wherein the $C_4$-$C_{30}$ α,β-unsaturated ester comprises an ester of acrylic acid with a fatty alcohol.

9. The process of claim 6, wherein the $C_4$-$C_{30}$ α,β-unsaturated ester comprises an ester of methacrylic acid with a fatty alcohol.

10. The process of claim 1, wherein the reaction product composition is contacted with at least one stoichiometric equivalent of the $C_4$-$C_{30}$ α,β-unsaturated ketone, the $C_4$-$C_{30}$ α,β-unsaturated ester, the $C_4$-$C_{30}$ α,β-unsaturated amide, or any combination thereof, per equivalent of thiophenol.

11. The process of claim 1, wherein the contacting occurs at a temperature less than or equal to about 200° C.

12. The process of claim 1, wherein the polar organic compound comprising less than 1 wt. % thiophenol is separated from the reaction product composition.

13. The process of claim 12, wherein the separated polar organic compound is used in a process for producing a poly(arylene sulfide) composition.

14. The process of claim 1, wherein the polar organic compound is an amide, a lactam, a sulfone, or any combination thereof.

15. The process of claim 1, wherein the $C_4$-$C_{30}$ α,β-unsaturated ketone, $C_4$-$C_{30}$ α,β-unsaturated ester, $C_4$-$C_{30}$ α,β-unsaturated amide, or any combination thereof, is contacted with the reaction product composition at a temperature from about 20° C. to about 50° C.

* * * * *